US010240090B2

(12) United States Patent
Bhowmik et al.

(10) Patent No.: US 10,240,090 B2
(45) Date of Patent: Mar. 26, 2019

(54) FIRE RETARDANT MATERIALS AND DEVICES INCLUDING SAME

(71) Applicants: THE BOARD OF REGENTS OF THE NEVADA SYSTEM OF HIGHER EDUCATION on behalf of THE UNIVERSITY OF NEVADA, LAS VEGAS, Las Vegas, NV (US); INNOSENSE LLC, Torrance, CA (US)

(72) Inventors: Pradip K. Bhowmik, Henderson, NV (US); Kisholoy Goswami, Redondo Beach, CA (US); Maksudul M. Alam, Glendora, CA (US); Haesook Han, Henderson, NV (US)

(73) Assignees: THE BOARD OF REGENTS OF THE NEVADA SYSTEM OF HIGHER EDUCATION ON BEHALF OF THE UNIVERSITY OF NEVADA, LAS VEGAS, Las Vegas, NV (US); INNOSENSE LLC, Torrance, CA (US)

(*) Notice: Subject to any disclaimer, the term of this patent is extended or adjusted under 35 U.S.C. 154(b) by 0 days.

(21) Appl. No.: 15/507,723

(22) PCT Filed: Aug. 28, 2015

(86) PCT No.: PCT/US2015/047529
§ 371 (c)(1),
(2) Date: Feb. 28, 2017

(87) PCT Pub. No.: WO2016/033520
PCT Pub. Date: Mar. 3, 2016

(65) Prior Publication Data
US 2017/0298278 A1    Oct. 19, 2017

Related U.S. Application Data

(63) Continuation-in-part of application No. 14/577,706, filed on Dec. 19, 2014, now Pat. No. 9,334,373.
(Continued)

(51) Int. Cl.
C09K 21/14    (2006.01)
C08G 79/04    (2006.01)
(Continued)

(52) U.S. Cl.
CPC .............. *C09K 21/14* (2013.01); *C08G 79/04* (2013.01)

(58) Field of Classification Search
CPC ....................................................... C09K 21/14
(Continued)

(56) References Cited

U.S. PATENT DOCUMENTS 3,835,119 A    9/1974 Hoffman
5,763,563 A    6/1998 Harris et al.
(Continued)

FOREIGN PATENT DOCUMENTS

CN    101627079 A    1/2010
CN    101802076 A    8/2010
(Continued)

OTHER PUBLICATIONS

International Search Report and Written Opinion for Application No. PCT/US2015/047529 dated Dec. 1, 2015 (8 pages).
(Continued)

*Primary Examiner* — Duc Truong
(74) *Attorney, Agent, or Firm* — Michael Best & Friedrich LLP

(57) ABSTRACT

This disclosure provides fire retardant materials, including polymers that include at least one pyridinium salt moiety
(Continued)

and at least one phosphine oxide moiety. In some cases, fire retardant polymers provided herein have the following structure:

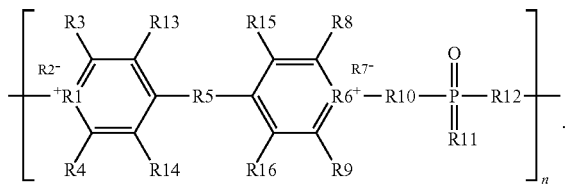

11 Claims, 24 Drawing Sheets

Related U.S. Application Data

(60) Provisional application No. 62/043,851, filed on Aug. 29, 2014.

(51) Int. Cl.
C09K 21/00 (2006.01)
C08G 79/00 (2006.01)

(58) Field of Classification Search
USPC .......................................................... 528/399
See application file for complete search history.

(56) References Cited

U.S. PATENT DOCUMENTS

| 2005/0143503 | A1 | 6/2005 | Bauer et al. |
| 2006/0090777 | A1 | 5/2006 | Hecht et al. |
| 2007/0080330 | A1 | 4/2007 | Peters et al. |
| 2007/0203270 | A1 | 8/2007 | Sicken et al. |
| 2009/0203831 | A1 | 8/2009 | Ma et al. |
| 2010/0210763 | A1 | 8/2010 | Fuchs |

FOREIGN PATENT DOCUMENTS

| EP | 03191566 A1 | 6/1989 |
| JP | H06212067 A | 8/1994 |
| RO | 79547 A2 | 8/1982 |
| WO | 2014120488 A1 | 8/2014 |

OTHER PUBLICATIONS

C. Negrell-Guirao, B. Boutevin, G. David, A. Fruchier, R. Sonnier, J.-M. LopezCuesta, Polym. Chem. 2011, 2, pp. 236-243.
C. Negrell-Guirao, B. Boutevin, Macromolecules 2009, 42, pp. 2446-2454.
F. Laoutid, L. Bonnaud, M. Alexandre, J.-M. Lopez-Cuesta, P. Dubois, Mater. Sci. Eng. R 2009, 63, pp. 100-125.
E. D. Weil, S. V. Levchik, J. Fire Sci. 2008, 26, pp. 243-281.
S. V. Levchik, E. D. Weil, J. Fire Sci. 2006, 24, pp. 345-364.
S. V. Levchik, E. D. Weil, Polym. Int. 2005, 54, pp. 11-35.
5. V. Levchik, E. D. Weil, Polym. Int. 2004, 53, pp. 1901-1929.
S.-Y. Lu, I. Hamerton, Prog. Polym. Sci. 2002, 27, pp. 1661-1712.
G. E. Zaikov, S. M. Lomakin, J. Appl. Polym. Sci. 1998, 68, pp. 715-725.
C. Wang, M. Kilitziraki, J. A. H. MacBride, M. R. Bryce, L. E. Horsburgh, A. K.Sheridan, A. P. Monkman, I. D. W. Samuel, Adv. Mater. 2000, 12, pp. 217-222.
H. Hong, R. Sfez, E. Vaganova, S. Yitzchaik, D. Davidov, Thin Solid Films 2000, 366, pp. 260-264.
Y. Z. Wang, A. J. Epstein, Acc. Chem. Res. 1999, 32, pp. 217-224.
X. Zhang, A. S. Shetty, S. A. Jenekhe, Acta Polym. 1998, 49, pp. 52-55.
S. A. Jenekhe, M. M. Alam, Y. Zhu, S. Jiang, A. V. Shevade, Adv. Mater. 2007, 19, pp. 536-542.
C. J. Tonzola, M. M. Alam, S. A. Jenekhe, Macromolecules 2005, 38, pp. 9839-9547.
C. J. Tonzola, M. M. Alam, S. A. Jenekhe, Macromol. Chem. Phys. 2005, 206, pp. 1271-1279.
T. W. Kwon, M. M. Alam, S. A. Jenekhe, Chem. Mater. 2004, 16, pp. 4657-4666.
Y. Eichen, G. Nakhmanovich, V. Gorelik, 0. Epshtein, J. M. Poplawski, E.Ehrenfreund, J. Am. Chem. Soc. 1998, 120, pp. 10463-10470.
A. J. Epstein, Y. Z. Wang, S. W. Jessen, J. W. Blatchford, D. D. Gebler, L.-B Lin, T. L. Gustafson, T. M. Swager, A. G. MacDiarmid, Macromol. Symp. 1997, 116, pp. 27-38.
Y. Z. Wang, D. D. Gebler, D. K. Fu, T. M. Swager, A.G. MacDiarmid, A. J. Epstein, Synth. Met. 1997, 85, pp. 1179-1182.
K. A. Bunten, A. K. Kakkar, Macromolecules 1996, 29, pp. 2885-2893.
D. D. Gebler, Y. Z.Wang, J. W. Blatchford, S. W. Jessen, L.-B. Lin, T. L. Gustafson, H. L. Wang, T. M. Swager, A.G. MacDiarmid, A. J. Epstein, J. Appl. Phys. 1995, 78, pp. 4264-4266.
T. Yamamoto, T. Muruyama, Z.-h Zhou, T. Ito, T. Fukuda, Y. Yoneda, F. Begum, T. Ikeda, S. Sasaki, H. Takezoe, A. Fukuda, K. Kubota, J. Am. Chem. Soc. 1994, 116, pp. 4832-4845.
T. Kawai, T. Yamaue, M. Onoda, K. Yoshino, Synth. Met. 1999, 102, pp. 971-972.
H. Han, P. R. Vantine, A. K. Nedeltchev, P. K. Bhowmik, J. Polym. Sci. Part A:Polym. Chem. 2006, 44, pp. 1541-1554.
P. K. Bhowmik, H. Han, I. V. Nedeltchev, J. Polym. Sci. Part A: Polym. Chem. 2002, 40, pp. 2015-2024.
P. K. Bhowmik, H. Han, J. J. Cebe, R. A. Burchell, A. M. Sarker, J. Polym. Sci. Part A: Polym. Chem. 2002, 40, pp. 559-674.
P. K. Bhowmik, A.H. Molla, H. Han, M. E. Gangoda, R. N. Bose, Macromolecules 1998, 31, pp. 621-630.
P. K. Bhowmik, S. Akhter, H. Han, J. Polym. Sci. Part A: Polym. Chem. 1995, 40, pp. 1927-1933.
P. K. Bhowmik, H. Han, J. Polym. Sci. Part A: Polym. Chem. 1995, 40, pp. 1745-1749.
H. Han, P. K. Bhowmik, Trends Polym. Sci. 1995, 3, pp. 199-206.
P. K. Bhowmik, W. Xu, H. Han, J. Polym. Sci. Part A: Polym. Chem. 1994, 32, pp. 3205-3209.
P. Masson, P. Gramain, D. Guillon, Macromol. Chem. Phys. 1999, 200, pp. 616-620.
W.-Y. Zheng, R.-H. Wang, K. Levon, Z. Y. Rong, T. Taka, W. Pan, Macromol. Chem. Phys. 1995, 196, pp. 2443-2462.
Y. Cao, P. Smith, Polymer 1993, 34, pp. 3139-3143.
A. Merz, S. Reitmeier, Angew. Chem., Int. Ed. Engl. 1989, 28, pp. 807-808.
J. S. Moore, S. I. Stupp, Macromolecules 1986, 19, pp. 1815-1824.
H. Akahoshi, S. Toshima, K. Itaya, J. Phys. Chem. 1981, 85, pp. 818-822.
M. S. Simon, P. T. Moore, J. Polym. Sci., Part A: Polym. Chem. 1975, 13, pp. 1-16.
T. S. Jo, A. K. Nedeltchev, B. Biswas, H. Han, P. K. Bhowmik, Polymer 2012, 53,pp. 1063-1071.
A. K. Nedeltchev, H. Han, P. K. Bhowmik, L. Ma, J. Polym. Sci. Part A: Polym.Chem. 2011, 49, pp. 1907-1918.
A. K. Nedeltchev, H. Han, P. K. Bhowmik, L. Ma, J. Polym. Sci. Part A: Polym. Chem. 2010, 48, pp. 4611-4620.
A. K. Nedeltchev, H. Han, P. K. Bhowmik, L. Ma, J. Polym. Sci. Part A: Polym. Chem. 2010, 48, pp. 4408-4418.
A. K. Nedeltchev, H. Han, P. K. Bhowmik, Polym. Chem. 2010, 1, pp. 908-915.
P. K. Bhowmik, H. Han, A. K. Nedeltchev, H. D. Mandal, J. A. Jimenez-Hernandez, P. M. McGannon, J. Appl. Polym. Sci. 2010, 116, pp. 1197-1206.
K. Bhowmik, H. Han, A. K. Nedeltchev, H. D. Mandal, J. A. Jimenez-Hernandez, P. M. McGannon, Polymer 2009, pp. 3128-3135.
P. K. Bhowmik, S. Kamatam, H. Han, A. K. Nedeltchev, Polymer 2008, 49, pp. 1748-1760.

(56) References Cited

OTHER PUBLICATIONS

P. K. Bhowmik, H. Han, A. K. Nedeltchev, Polymer 2006, 47, pp. 8281-8288.
P. K. Bhowmik, H. Han, A. K. Nedeltchev, J. Polym. Sci. Part A: Polym. Chem. 2006, 44, pp. 1028-1041.
P. K. Bhowmik, H. Han, J. J. Cebe, I. K. Nedeltchev, S.-W. Kang, S. Kumar, Macromolecules 2004, 37, pp. 2688-2694.
P. K. Bhowmik, R. A. Burchett, H. Han, J. J. Cebe, Polymer 2002, 43, pp. 1953-1958.
P. K. Bhowmik, R. A. Burchett, H. Han, J. J. Cebe, Macromolecules 2001, 34, pp. 7579-7581.
P. K. Bhowmik, R. A. Burchett, H. Han, J. J. Cebe, J. Polym. Sci. Part A: Polym. Chem. 2001, 39, pp. 2710-2715.
I. K. Spiliopoulos, J. A. Mikroyannidis, J. Polym. Sci. Part A: Polym. Chem. 2001, 39, pp. 2454-2462.
F. W. Harris, K. C. Chuang, S. A. X. Huang, J. J. Janimak, S. Z. D. Cheng, Polymer 1994, 35, pp. 4940-4948.
S. A. X. Huang, K. C. Chuang, S. Z. D. Cheng, F. W. Harris, Polymer 2000, 41, pp. 5001-5009.
G. Decher, Science 1997, 277, pp. 1232-1237.
P. Bertrand, A. Jonas, A. Laschewsky, R. Legras, Macromol. Rapid Commun. 2000, 21, pp. 319-348.
X. Arys, A. Laschewsky, A. M. Jonas, Macromolecules 2001, 34, pp. 3318-3330.
X. Arys, P. Fischer, A. M. Jonas, M. M. Koetse, A. Laschewsky, R. Legras, E. Wischerhoff, J. Am. Chem. Soc. 2003, 125, pp. 1859-1865.
Z. Tang, N. A. Kotov, S. Magonov, B. Ozturk, Nat. Mater. 2003, 2, pp. 413-418.
A. Laschewsky, F. Mallwitz, J.-F. Baussard, D. Cochin, P. Fischer, J.-L. H. Jiwan, E. Wischerhoff, Macromol. Symp. 2004, 211, pp. 135-155.
E. Holder, V. Marin, A. Alexeev, U. S. Schubert, J. Polym. Sci. Part A: Polym.Chem. 2005, 43, pp. 2765-2776.
R. Dobrawa, F. Wurthner, J. Polym. Sc. Part A: Polym. Chem. 2005, 43, pp. 4981-4995.
Y. Bar-Cohen, ""Electroactive polymers as artificial muscles-reality and challenges.""Proceeding of the 42nd AIAA Structures, Structures Dynamics and Materials Conferences (SDM), Gossamer Spacecraft Forum (GSF), held in Seattle, WA, Apr. 16-19, 2001, pp. 1-10.
Y. W. Chen-Yang, C. Y. Yuan, C.H. Li, H. C. Yang, J. Appl. Polym. Sci. 2003, 90, pp. 1357-1364.
W. Wu, C. Q. Yang, J. Appl. Polym. Sci. 2003, 90, pp. 1885-1890.
Y.-L. Liu, G.-H. Hsiue, C.-W. Lan, Y.-S. Chiu, J. Polym. Sci. Part A: Polym. Chem. 1997, 35, pp. 1769-1780.
H-J. Kim, J.-K. Choi, B.-W. Jo, J.-H. Chang, R. J. Panis, Korea Polym. J. 1998, 6, 84.
C. Tian, H. Wang, X. Liu, Z. Ma, H. Guo, J. Xu, J. Appl. Polym. Sci. 2003, 89, pp. 3137-3142.
H. Galip, H. Hasipoglu, G. Gunduz, J. Appl. Polym. Sci. 1999, 74, pp. 2906-2910.
J. Liu, Y. Gao, F. Wang, M. Wu, J. Appl. Polym. Sci. 2000, 75, pp. 384-389.
T. Kashiwagi, A. B. Morgan, J. M. Antonucci, M. R. VanLandingham, R. H. Harris, Jr., W. H. Awad, J. R. Shields, J. Appl. Polym. Sci. 2003, 89, pp. 2072-2078.
Q. Wu, J. Lu, B. Qu, Polym. Int. 2003, 52, pp. 1326-1331.
Y.-L. Liu, G.-H. Hsiue, Y.-S. Chiu, J. Polym. Sci. Part A: Polym. Chem. 1997, 35, pp. 565-574.
K. G. Gravalos, J. Polym. Sci. Part A: Polym. Chem. 1992, 30, pp. 2521-2529.
Y. L. Liu, Y. L. Liu, R. J. Jeng, Y.-S. Chiu, J. Polym. Sci. Part A: Polym. Chem. 2001, 39, pp. 1716-1725.
R. P. Mateva, N. V. Dencheva, J. Appl. Polym. Sci. 1993, 47, pp. 1185-1192.
Z. Ma, W. Zhao, Y. Liu, J. Shi, J. Appl. Polym. Sci. 1997, 63, pp. 1511-1515.
K. Faghihi, M. Hajibeygi, J. Appl. Polym. Sci. 2004, 92, pp. 3447-3453.
J. W. Connell, K. A. Watson, High Perform. Polym. 2001, 13, pp. 23-34.
C. D. Smith, H. Grubbs, H.F. Webster, A. Gungor, J.P. Wightman, J. E. McGrath, High Perform. Polym. 1991, 3, pp. 211-229.
J. G. Smith, Jr., J. W. Connell, P. M. Hergenrother, Polymer 1994, 35, pp. 2834-2839.
J. W. Connell, J. G. Smith, Jr., P. M. Hergenrother, Polymer 1995, 36, pp. 5-11.
J. W. Connell, J. Smith, Jr., J. Hedrick, Polymer 1995, 36, pp. 13-19.
J. Lennhoff, G. Harris, J. Vaughn, D. Edwards, J. Zwiener, High Perform. Polym. 1999, 11, pp. 101-111.
Y.-L. Liu, G.-H. Hsiue, Y.-S. Chiu, R.-J. Jeng, J. Appl. Polym. Sci. 1996, 61, pp. 1789-1796.
P. Schuler, H.B. Mojazza, R. Haghighat, High Perform. Polym. 2000, 12, pp. 113-123.
M. F. Martinez-Nunez, V. N. Sekharipuram, J. E. McGrath, Polym. Prepr., Am.Chem. Soc. Div. Polym. Chem. 1994, 35 (2), pp. 709-710.
C. Kizilkaya, S. Karata~, N.-K. Apohan, A. Gungor, J. Appl. Polym. Sci. 2010, 115, pp. 3256-3264.
T. Brock, D. C. Sherrington, J. Swindell, J. Mater. Chem. 1994, 4, pp. 229-236.
K. U. Jeong, J.-J Kim, T.-H. Yoon, Polymer 2001, 42, pp. 6019-6030.
P. M. Hergenrother, S. J. Havens, J. Polym. Sci. Part A: Polym. Chem. 1989, 27, pp. 1161-1174.
A. K. Agrawal, S. A. Jenekhe, Chem. Mater. 1996, 8, pp. 579-589.
C.J. Yang, S. A.Jenekhe, "Conjugated Aromatic Polyimines. 2. Synthesis, Structure, and Properties of New Aromatic Polyazomathines", Macromolecules 1995, 28, 1180-1196.
A. Rosy, J. Polym. Sci. Part A: Polym. Chem. 1993, 31, pp. 3187-3191.
Office Action with English translation from the State Intellectual Property Office of the People's Republic of China for Application No. 201580051742.X dated Mar. 9, 2018 (11 pages).
Extended European Search Report from the European Patent Office for Application No. 15835410.0 dated Mar. 26, 2018 (7 pages).

FIRE RETARDANT MATERIALS AND DEVICES INCLUDING SAME

CROSS REFERENCE TO RELATED APPLICATIONS

This application is a U.S. National Stage of entry of International Patent Application No. PCT/US2015/047529, filed on Aug. 28, 2015, which claims priority to U.S. patent application Ser. No. 14/577,706, filed on Dec. 19, 2014, now U.S Pat No. 9334373 which claims the benefit of U.S. Provisional Patent Application No. 62/043,851, filed on Aug. 29, 2014, each of which are hereby incorporated by reference in their entirety for all of their teachings.

STATEMENT REGARDING FEDERALLY FUNDED RESEARCH

This invention was made with government support under grant number 0447416 awarded by the National Science Foundation (NSF EPSCoR RING-TRUE III); grant number OII-0610753 awarded by the National Science Foundation Small Business Innovation Research program; grant number IIP-0740289 awarded by the National Science Foundation Small Business Technology Transfer Research Phase I program; and contract number NNX10CD25P awarded by the NASA GRC. The government has certain rights in the invention.

FIELD OF INVENTION

This disclosure relates to fire retardant materials and devices including fire retardant materials. In some cases, a fire retardant material provided herein can include a poly (pyridinium) salt moiety and a phosphine oxide moiety.

BACKGROUND

Polymers are commonly used in various products due to their tunable mechanical properties and ease of processing. Fire retardant polymers are polymers that are resistant to degradation at high temperatures. There is need for fire-resistant polymers in a variety of fields, including the construction of small, enclosed spaces such as skyscrapers, boats, and airplane cabins. In tight spaces, the ability to escape in the event of a fire is compromised, increasing fire risk. Fire-safe polymers also find application as adhesives in aerospace materials, insulation for electronics, and in military materials such as canvas tenting. Common polymers, however, can be highly combustible and can produce toxic gases and smoke during combustion. One common way to make polymers more resistant to combustion is to include flame retardant additives in a polymer. Flame retardant additives such as polychlorinated biphenyls and brominated flame retardants, however, can pose certain health concerns.

Six novel high-temperature tolerant phosphine oxide-containing poly(4,4'-(p-phenylene)-bis(2,6-diphenylpyridinium)) polymers P-1, P-2, P-3, P-4, P-5, and P-6 were synthesized, characterized and evaluated. They were synthesized in high yield and purity. High glass transition temperature (Tg>240° C.) and high char yield (>50% at 700° C.) were determined by differential scanning calorimetry (DSC) and thermogravimetric analysis (TGA), respectively. These ionic polymers exhibit excellent processability, thin-film forming, high-temperature resistance, fire-resistance and retardation, coating, adhesion, mechanical and tensile strength, and n-type (electron transport) properties. Incorporation of phosphine oxide and bis(phenylpyridinium) moieties in the polymer backbone leads to high glass transition temperature and fire retardant properties. The use of organic counterions allows these ionic polymers to be easily processable from a number of common organic solvents. A variety of these polymers can be synthesized by utilizing structural variants of the bispyrylium salt, phosphine oxide containing diamine, and the counterion in a combinatorial fashion. These results make them very attractive for a number of applications, including as coating and structural component materials for automobiles, aircrafts, power and propulsion systems, firefighter garments, printed circuit boards, cabinets and housings for electronic and electrical components, construction materials, mattresses, carpets, upholstery and furniture, and paper-thin coating for protecting important paper documents.

The fire retardant polymers provided herein can include pyridinium salt moieties, phosphine oxide moieties, and combinations thereof. In some cases, a fire retardant polymer provided herein can include repeating units each including at least one pyridinium salt and/or and at least one phosphine oxide moiety. In some cases, a fire retardant polymer provided herein can be a random copolymer of pyridinium salt moieties and phosphine oxide moieties. In some cases, a fire retardant polymer provided herein is substantially free of halogens.

The details of one or more embodiments are set forth in the accompanying description below. Other features and advantages will be apparent from the description, drawings, and the claims.

SUMMARY

The present invention relates to fire retardant polymers comprising at least one pyridinium salt moiety and at least one phosphine oxide moiety, and devices made therewith.

Other aspects of the invention will become apparent by consideration of the detailed description and accompanying drawings.

BRIEF DESCRIPTION OF THE DRAWINGS

The drawings below are supplied in order to facilitate understanding of the Description and Examples provided herein.

DETAILED DESCRIPTION

Figure 1:
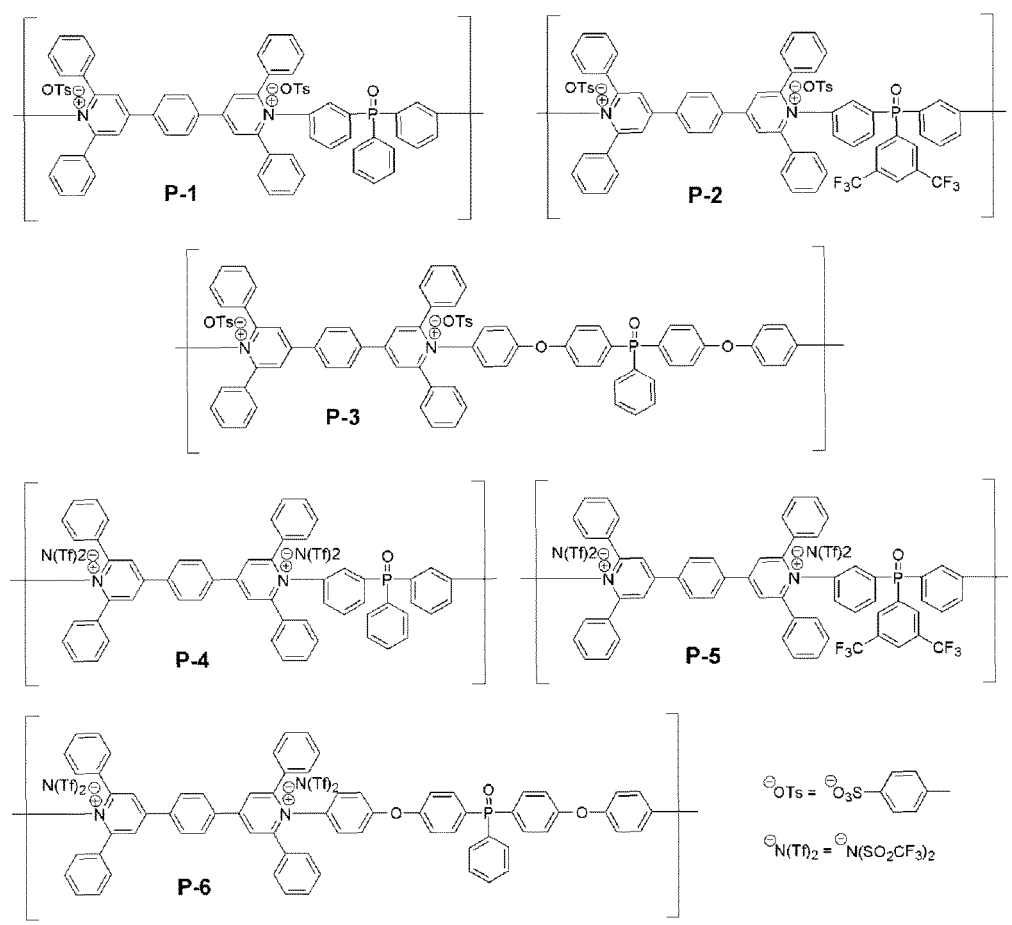
FIG. 1 depicts the chemical structures of various exemplary embodiments of fire retardant polymers provided herein.

Polymers are extensively used in our everyday lives due to their tunable properties and ease of processing. These qualities render polymers useful for applications ranging from adhesives and lubricants to structural components and windows for aircrafts. However, common polymers are also highly combustible, and produce toxic gases and smoke during combustion. Thus, the development of polymers with fire retardant properties is needed, particularly for the improved fire performance of materials used in construction, transportation and clothing. At the same time, some fire resistant materials containing bromine or chlorine moieties are being phased out due to their detrimental effects on health and the environment during combustion. Thus, the development of effective fire resistant polymers that can be produced and utilized safely and in an environmentally conscious manner is of great interest.

Nitrogen-containing polymers have received attention in the design and synthesis of ionic polymers having desirable electroluminescent (EL), conducting, and liquid-crystalline (LC) properties, which make them attractive materials in many technological applications. Among the nitrogen-containing EL polymers, poly(pyridinium) salts have received considerable interest and attention for applications in electronic and optoelectronic devices for displays and lighting, solar light harvesting, sensors, photonic devices, automobile and aircraft parts, and for packaging in electronic industry. These ionic EL polymers exhibit a number of interesting properties including redox behavior, electrical conductivity, electrochromism, photochromism, thermochromism, and LC properties. The ionic polymers are appropriate polymers for the construction of functional multilayer assemblies by a sequential layer-by-layer deposition technique through electrostatic interactions. The ionic EL polymers, also known as electroactive polymers (EAPs), have the ability to induce strains that are as high as two orders of magnitude greater than the movements possible with rigid and fragile electroactive ceramics. EAP materials also have higher response speed, lower density and improved resilience when compared to shape memory alloys. Synthesis of photoactive and electroactive ionic polymers by the ring-transmutation polymerization reaction, and characterization of their properties, are known. These ionic polymers generally have high glass transition temperatures, $T_g$, and are thermally and thermo-oxidatively stable. They are highly crystalline and have excellent film forming properties. Although conventional poly(pyridinium) salts have very attractive properties and are thermally stable, they lack the robust, high-temperature, high-performance, high mechanical-strength, low-cost and lightweight of ionic EL polymer materials.

Over the course of recent decades, conventional materials such as metal, wood, glass and ceramic have been increasingly replaced by synthetic polymers due to their versatility, low density, mechanical properties, and the ease with which they can be molded. However, these advantages are shadowed by their flammability and low stability in high temperatures in comparison to metals. Considerable attention has been focused on preparing flame-retardant polymers, and, among these, phosphorus-containing polymers are widely used. Phosphorus moieties have been incorporated into different polymeric backbones, including epoxy resin, poly(amic acid), polycarbonate, poly(vinyl chloride), polyester, polyimide, and poly(methyl methacrylate). Among the polymers with phosphorus containing moieties, the polymers with phosphine oxide moieties have flame-retardant properties, thermal oxidative stability, solubility in organic solvents, miscibility, and adhesion to other compounds. Although incorporation of phosphine oxide moieties in the polymer backbone results in improved properties, however, manufacturing costs with these polymers are prohibitive because they are difficult to process. Currently, there are no robust high temperature, high performance and lightweight phosphine oxide-containing electroactive and photoactive ionic polymers that can be manufactured and processed cost-effectively, and whose properties can be fine-tuned using straightforward synthetic routes. Thus, the development of easily processable phosphine oxide-containing ionic EL polymers having high temperature resistance and photoluminescence efficiency is needed. The combination of ionic polymeric materials with high temperature resistant phosphine oxide group in the form of macromolecular architecture has the potential to deliver such novelty.

Before any embodiments of the invention are explained in detail, it is to be understood that the invention is not limited in its application to the details of construction and the arrangement of components set forth in the following description or illustrated in the figures. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof, as well as additional items.

It also should be understood that any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

It should be understood that, as used herein, the term "about" is synonymous with the term "approximately." Illustratively, the use of the term "about" indicates that a value includes values slightly outside the cited values. Variation may be due to conditions such as experimental error, manufacturing tolerances, variations in equilibrium conditions, and the like. In some embodiments, the term "about" includes the cited value plus or minus 10%. In all cases, where the term "about" has been used to describe a value, it should be appreciated that this disclosure also supports the exact value.

Reference throughout this specification to "one embodiment," "an embodiment," or similar language means that a particular feature, structure, or characteristic described in connection with the embodiment is included in at least one embodiment of the invention provided herein. Thus, appearances of the phrases "in one embodiment," "in an embodiment," and similar language throughout this specification may, but do not necessarily, all refer to the same embodiment.

Furthermore, the described features, structures, or characteristics of the methods and devices provided herein may be combined in any suitable manner in one or more embodiments. In the following description, numerous specific details are provided, to provide a thorough understanding of embodiments. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the embodiments.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, and tetracosyl. The alkyl group may be cyclic, such as cyclohexyl or cyclopentyl. A "lower alkyl" group is an alkyl group containing from one to six carbon atoms. The alkyl group may be unsubstituted or substituted with one or more groups including, but not limited to, alkyl, alkenyl, alkynyl, aryl, aryloxy, halide, haloalkyl, nitro, amino, ester, ketone, aldehyde, hydroxy, carboxylic acid, or alkoxy.

The term "alkenyl group" is defined herein as a C2-C20 alkyl group possessing at least one C=C double bond. The term "alkynyl group" is defined herein as a C2-C20 alkyl group possessing at least one C—C triple bond. The alkenyl or alkynyl group may be unsubstituted or substituted with one or more groups including, but not limited to, alkyl, alkenyl, alkynyl, aryl, aryloxy, halide, haloalkyl, nitro, amino, ester, ketone, aldehyde, hydroxy, carboxylic acid, or alkoxy.

The term "amino group" is defined herein as a group possessing at least one nitrogen atom with the formula —NR'R" wherein R' and R" are each independently selected from hydrogen, alkyl, aryl and heteroaryl, or R' and R", together with the nitrogen to which they are attached, may form a ring structure. The groups R' and R" may be optionally substituted, e.g., with one or more substituents. The amino group may be a primary (i.e. RNH$_2$), secondary (i.e. RRNH), tertiary (i.e. RRRN) or quaternary ammonium group (i.e. RRRRN$^+$). Examples of amino groups include, but are not limited to, —NH$_2$, alkylamino groups such as —NHCH$_3$, —NHCH$_2$CH$_3$ and —NHCH(CH$_3$)$_2$, dialkylamino groups such as —N(CH$_3$)$_2$ and —N(CH$_2$CH$_3$)$_2$, and arylamino groups such as —NHPh.

The term "aromatic" as used herein is a compound containing at least one conjugated ring, and includes aryl and heteroaryl groups.

The term "aryl group" as used herein is a monocyclic, bicyclic, or tricyclic hydrocarbon ring system containing at least one aromatic ring, wherein any ring atom capable of substitution can be substituted (e.g., with one or more substituents). Examples of aryl moieties include, but are not limited to, phenyl, naphthyl, anthracenyl, fluorenyl and biphenylene. The aryl group can be unsubstituted or substituted with one or more groups including, but not limited to, alkyl, alkenyl, alkynyl, aryl, aryloxy, halide, haloalkyl, nitro, amino, ester, ketone, aldehyde, hydroxy, carboxylic acid, or alkoxy. Examples of substituted aryl groups include biphenyl, phenoxyphenyl, aminophenoxyphenyl and trifluoromethyl-aminophenoxyphenyl.

The term "heteroaryl group" as used herein is an aromatic 3-8 membered monocyclic, 8-12 membered bicyclic, or 11-14 membered tricyclic ring system having 1-3 heteroatoms if monocyclic, 1-6 heteroatoms if bicyclic, or 1-9 heteroatoms if tricyclic, with at least one heteroatom incorporated within the ring of the aromatic group. Examples of heteroatoms include, but are not limited to, nitrogen, oxygen, sulfur, and phosphorus. The heteroaryl group can be unsubstituted or substituted with one or more groups including, but not limited to, alkyl, alkenyl, alkynyl, aryl, aryloxy, halide, haloalkyl, nitro, amino, ester, ketone, aldehyde, hydroxy, carboxylic acid, or alkoxy. Examples of heteroaryl groups include, pyridyl, pyrazinyl, furanyl, oxazolyl, thiophenyl, pyrimidinyl, and benzannulated ring systems such as benzimidazole and quinoline.

Herein is described the design, synthesis, characterization and evaluation of novel fire retardant ionic polymers which contain at least one pyridinium moiety and at least one phosphine oxide moiety, and devices which include such a polymer. Exemplary fire retardant ionic polymers are shown in FIG. 1.

The fire retardant polymer provided herein can be inherently fire retardant. In certain embodiments, the fire retardant polymer provided herein can be made up of at least two general components; a monomeric component (M) containing at least one pyridinium moiety, and an aromatic component (Ar) containing at least one phosphine oxide moiety. The polymer may have the general structure shown in Formula 1:

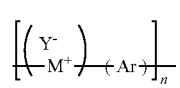

Formula 1 wherein M+ is a cationic monomeric component, Y– is an anionic counterion, Ar is an aromatic component, and n is a number from 2 to about 100,000. In certain embodiments, M+ is a pyridinium moiety, Y– is an anionic counterion, and Ar is an aryl phosphine oxide.

Figure 2:
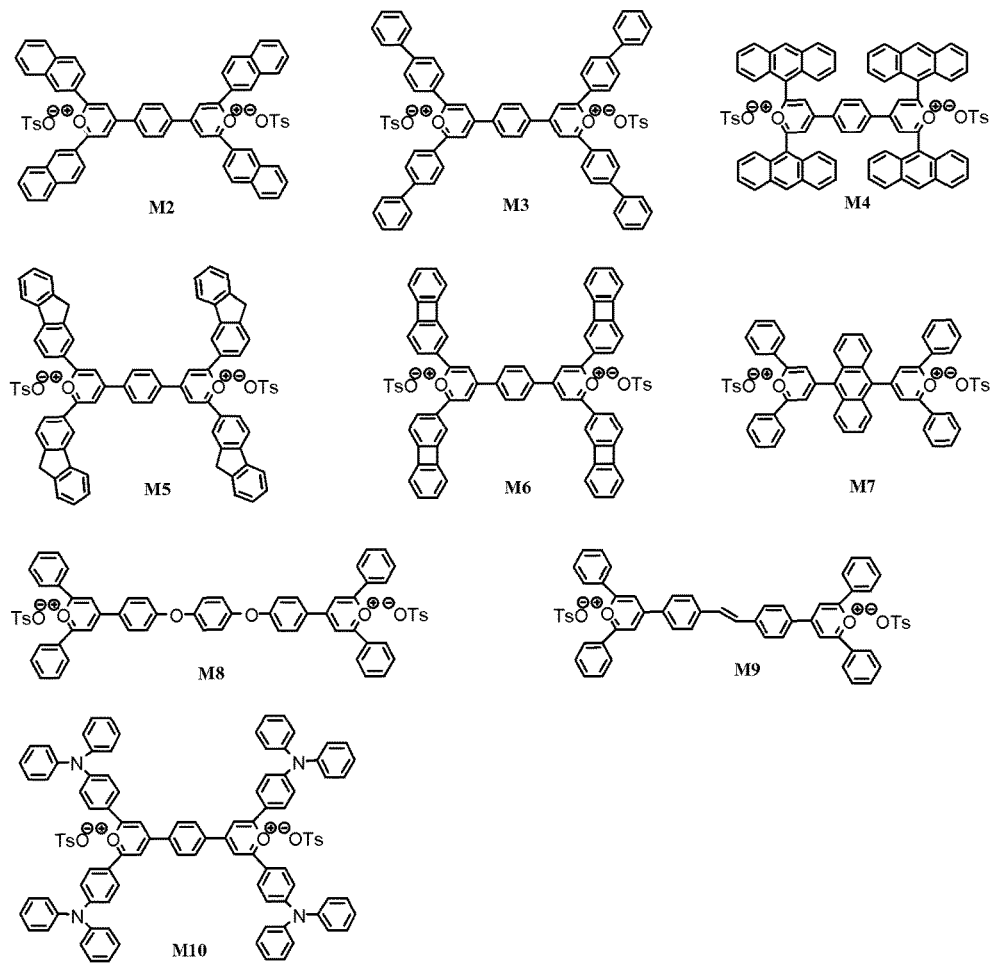
FIG. 2 depicts exemplary chemical structural variations of the monomer component, M2-M10, which can be included in the fire retardant polymers provided herein.

Fire retardant polymers provided herein can include any suitable pyridinium salt moiety as M+, including those derived from the monomers shown in FIG. 2. Pyridinium salt moieties in fire retardant polymers provided herein can, in certain embodiments, include one or more aromatic groups. In some embodiments, the pyridinium salt moiety includes one or more aryl or heteroaryl groups. Pyridinium salt moieties in fire retardant polymers provided herein can, in some embodiments, include one or more phenyl groups. In some embodiments, pyridinium salt moieties in fire retardant polymers provided herein can include at least two pyridinium groups.

In some embodiments, pyridinium salt moieties in fire retardant polymers provided herein can include at least two pyridinium groups bonded together via one or more aromatic groups, such as an aryl or heteroaryl group. In some embodiments, pyridinium salt moieties in fire retardant polymers provided herein can include at least two pyridinium groups bonded together via one or more phenyl groups. In some embodiments, pyridinium salt moieties in fire retardant polymers provided herein can include at least two aromatic groups, such as at least two phenyl groups. The pyridinium salt moiety may include at least two aromatic groups which are bonded to, or linked to, each other via an oxygen, phenyl, O-phenoxy (i.e. —O-phenyl-O—), alkenyl, napthyl, or anthracenyl group. Other suitable pyridinium salt moieties are discussed below.

Figure 3:
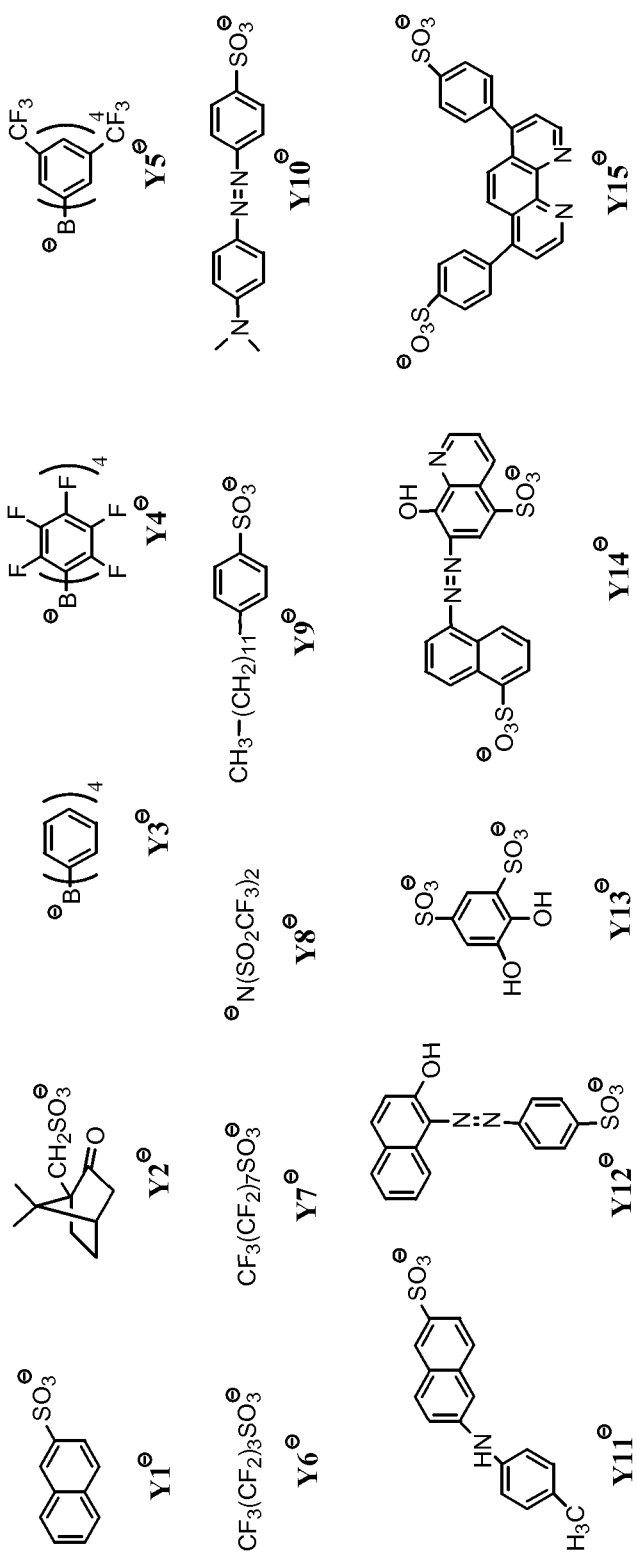
FIG. 3 depicts exemplary chemical structural variations of the counterion component, Y1-Y15, which can be included in the fire retardant polymers provided herein.

Pyridinium salt moieties in fire retardant polymers provided herein can include any suitable negatively charged ion ($Y^-$). In some cases, pyridinium salt moieties used in fire retardant polymers provided herein can be selected from a group made up of the counterions as shown in FIG. 1 and FIG. 3. Examples of suitable counterions include aryl and heteroaryl sulfonates, aryl and heteroaryl borates, and dihaloalkyl sulfonamides, such as tosylate and triflimide.

Fire retardant polymers provided herein can include any suitable aromatic phosphine oxide moiety (Ar). Phosphine oxide moieties in fire retardant polymers provided herein can, in some cases, include at least one aryl or heteroaryl group, such as at least one phenyl group. In some embodiments, the phosphine oxide moieties can include at least two aryl or heteroaryl groups, such as at least two phenyl groups. In some embodiments, the phosphine oxide moieties can include at least three aryl or heteroaryl groups, such as at least three phenyl groups. In some embodiments, the phosphine oxide moieties can include at least one amine substituted phenyl group. In some embodiments, the phosphine oxide moieties comprise at least one trifluoromethyl substituted phenyl group. In some embodiments, the phosphine oxide moieties can include triphenyl phosphine. In certain embodiments, the phosphine oxide moieties can include a phenoxylphenyl group, an aminophenoxylphenyl group, or a diphenoxyphenyl group, in which a phenyl group may be substituted with a halo, alkyl, haloalkyl or amino substituent. Other suitable phosphine oxide moieties are discussed below.

In some embodiments, fire retardant polymers of the general structure of Formula 1 provided herein have the structure shown in Formula 2:

Formula 2

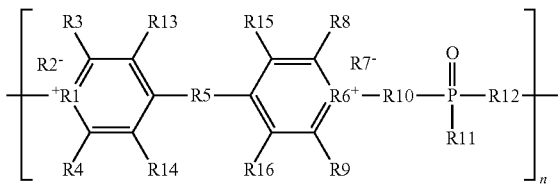

wherein R1 and R6 are each N, wherein R2 and R7 are each negatively charged counterions, wherein R3, R4, R8, R9, R11, R13, R14, R15, and R16 are each H or a group including one or more carbon atoms, and wherein R5, R10, and R12 are each groups including one or more carbon atoms, and wherein n is a number between 2 and about 100,000.

In an embodiment, R1 and R6 are each N, and R2 and R7 are each individually selected from the group consisting of tosylate and triflimide. In certain embodiments, R3, R4, R8, R9, R11, R13, R14, R15, and R16 are each individually selected from the group consisting of H, alkyl, aryl and heteroaryl. In some embodiments, R5, R10, and R12 are each individually selected from the group consisting of alkyl, alkenyl, alkynyl, aryl and heteroaryl. In an embodiment, n is a number between 2 and about 100,000. In certain embodiments, R1 and R6 are each N; R2 and R7 are each individually selected from the group consisting of tosylate and triflimide; R3, R4, R8, R9, R11, R13, R14, R15, and R16 are each individually selected from the group consisting of H, alkyl, aryl and heteroaryl; R5, R10, and R12 are each individually selected from the group consisting of alkyl, alkenyl, alkynyl, aryl and heteroaryl; and n is a number between 2 and about 100,000.

In some embodiments, at least one of R3, R4, R8, R9, R13, R14, R15, and R16 includes an aryl or heteroaryl group, such as a phenyl group. In some embodiments, at least one of R10, R11, and R12 includes an aryl or heteroaryl group, such as a phenyl group. In some embodiments, R3, R4, R5, R8, R9, R10, R11, and R12 each include a phenyl group. In some embodiments, R3, R4, R5, R8, R9, R10, R11, and R12 each consist of a phenyl group. In some embodiments, n is between 2 and about 70,000, or between 2 and about 65,000. In certain embodiments, n is not more than about 100,000, at least about 10,000, or at least about 30,000. In one embodiment, n is between about 30,000 and about 65,000.

Fire retardant polymer provided herein can include pyridinium salt moieties and phosphine oxide moieties. FIG. 1 depicts the chemical structures of various embodiments of fire retardant polymers including pyridinium salt moieties provided herein. As shown in FIG. 1, exemplary polymer P-1 includes a repeating unit including a pyridinium salt moiety including bis(2,6-diphenylpyridinium) ditosylate and a phosphine oxide moiety including triphenyl phosphine oxide. As shown, P-1 includes tosylate counterions (OTs-). P-2 is similar to P1, but includes a trifluoromethyl substituted triphenyl phosphine oxide moiety. P-3 is similar to P-1, but includes oxy-phenyl groups between each bis(2,6-diphenylpyridinium) ditosylate and each triphenyl phosphine oxide. P-4 is similar to P-1, but includes $N(Tf)_2$-counterions instead of tosylate counterions. P-5 is similar to P-2, but includes $N(Tf)_2$-counterions instead of tosylate counterions. P-6 is similar to P-3, but includes $N(Tf)_2$-counterions instead of tosylate counterions.

FIG. 2 depicts monomers of pyrylium salt chemical structural variations, M2-M10, which can be used to form the polymers, including the bis(2,6-diphenylpyridinium) ditosylate portion of polymers P-1 and P-4 depicted in FIG. 1. M2-M10 are exemplary pyrylium salts having varying chemical architectures from which, upon polymerization with an amine-containing moiety, poly(pyridinium) salts are produced that have structures identical to that shown in M2-M10 in FIG. 2, but having the one or more pyrylium oxygen atoms replaced with nitrogen atoms. Each of M2-M10 can be used to form the polymers provided herein.

FIG. 3 depicts exemplary chemical structural variations, Y1-Y15, which can be used as counterions in polymers provided herein. For example, Y1-Y15 can be substituted for the tosylate or triflimide counterions in the polymers depicted in FIG. 1. In some cases, as shown, the counterions provided herein can be aliphatic. In some cases, as shown, counterions provided herein can be aromatic. In some cases, as shown, counterions provided herein can have a single negative charge. In some cases, as shown, counterions provided herein can be doubly negatively charged.

Figure 4:
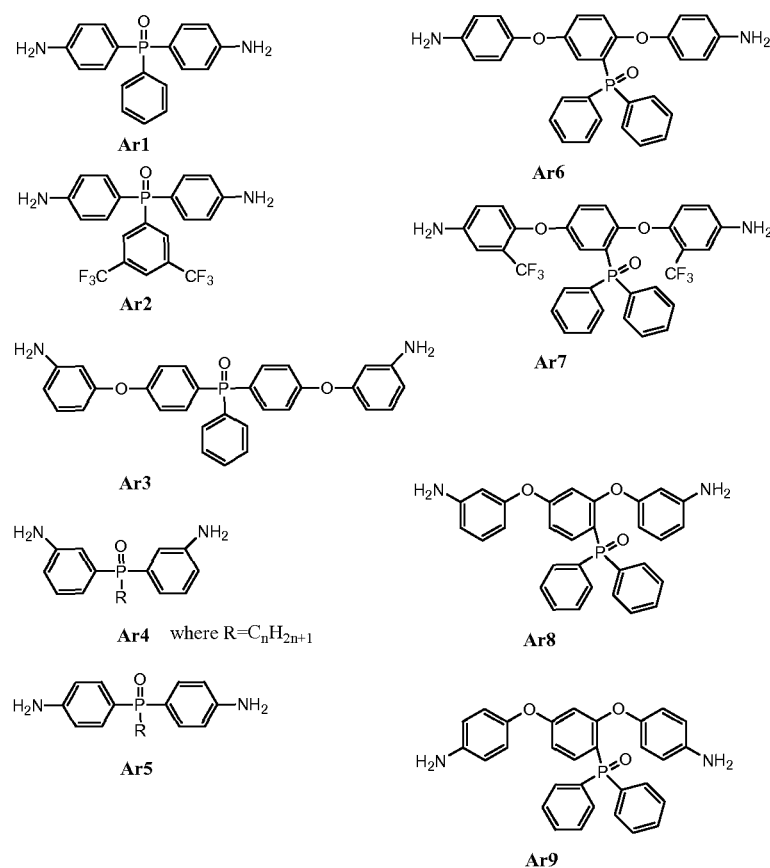
FIG. 4 depicts exemplary chemical structural variations of the aromatic phosphine oxide component, Ar1-Ar9, which can be included in the fire retardant polymers provided herein.

FIG. 4 depicts exemplary chemical structural variations, Ar1-Ar9 which can be used as the aromatic phosphine oxide moieties in polymers provided herein. Ar1-Ar9 are examples of aromatic diamine phosphine oxide compounds which can be reacted with a bispyrylium compound using a ring-transmutation polymerization reaction, to form the inventive polymers.

The synthesis of the novel phosphine oxide-containing poly(4,4'-(p-phenylene)-bis(2,6-diphenylpyridinium)) ionic polymers P-1, P-2, P-3, P-4, P-5, and P-6 use a ring-transmutation polymerization reaction. Thermal stability, fire resistant, char yields, mechanical strength, coating and film forming, optical absorption, photoluminescence, electrochemical and morphological properties of these ionic polymers have been studied to establish them as potential high temperature and high performance materials. The synthetic approach is versatile and amenable to low-cost mass production. This versatility stems from the fact that a large variety of these polymers can be synthesized by utilizing structural variants of the bispyridinium salt, phosphorous oxide containing diamine, and the counterion in a combinatorial fashion. Thus, the chemical structural modifications allow fine-tuning of their fire retardant properties.

Fire retardant polymers provided herein can be used in any suitable product. In some cases, fire retardant polymer provided herein can be used in a building (e.g., a skyscraper, an apartment building, a tent, etc.) or a vehicle (e.g., a car, a military transport, an airplane, a spacecraft, etc.). In some cases, fire retardant polymers provided herein can be used as insulation for electronic equipment. In some cases, fire retardant polymer provided herein can be used as a membrane. In some cases, multiple nanoscale layers of differently charged polymer described herein can be used to make a membrane.

Fire retardant polymers provided herein can have one or more of the following advantages. In some cases, fire retardant polymers provided herein can be relatively inexpensive to produce and/or process. In some cases, fire retardant polymers provided herein can be mass produced. In some cases, fire retardant polymers provided herein can be processable with common organic solvents. In some cases, fire retardant polymers provided herein can have good film-forming properties. In some cases, fire retardant polymers provided herein can have high char yields and/or low flammability.

One purpose for using both phenylated bispyridinium ditosylate and phenyl phosphine oxide moieties in the backbone is to develop advanced polymeric structural materials with high thermal stability, high glass transition temperature, and enhanced photophysical, electrochemical, thermal and mechanical properties.

Chemical structures of 4,4'-(1,4-phenylene)-bis(2,6-diphenylpyrylium) ditosylate monomer (compound M), and phosphine oxide containing diamines, bis(3-aminophenyl) phenyl phosphine oxide (m-DAPPO), bis(3-aminophenyl)-3,5-bis(trifluoromethyl)phenyl phosphine oxide (BATFPO) and bis(4-aminophenoxy-4-phenyl) phenyl phosphine oxide (p-BAPPO), are shown below:

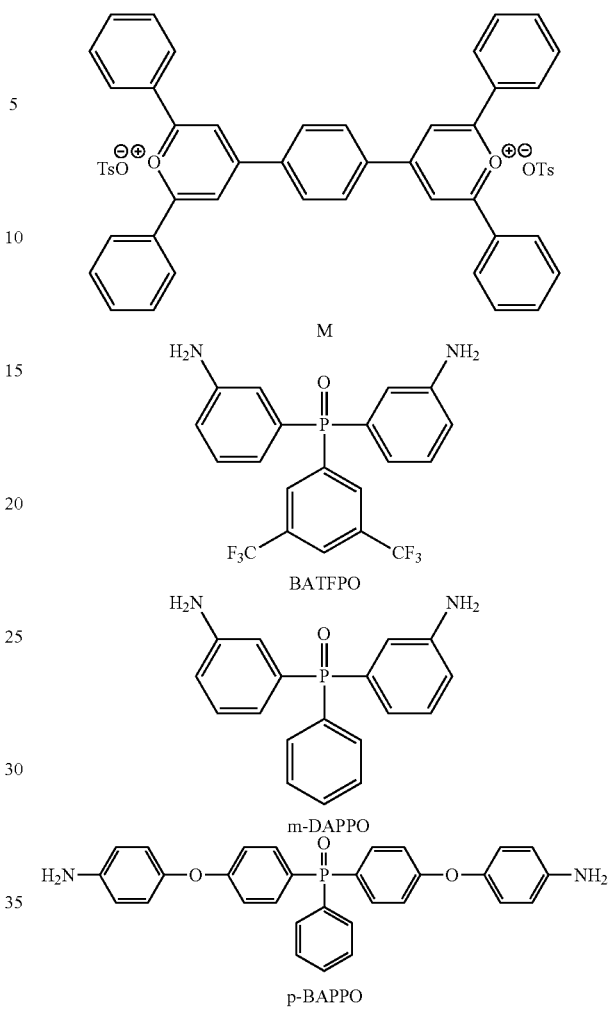

Bispyrylium ditosylate monomer (labeled as compound M in the compounds shown above) is an excellent building block for the design and development of ionic polymers with both liquid-crystalline (LC) and light-emitting properties. Compound M is an example of a monomer which can be used in the synthesis of the polymers disclosed herein. It contains a stable phenyl group and heteroatom in the aromatic ring that increase the thermal stability. Since these ionic polymers are cationic, they have great potential for building up multilayer assemblies with anionic polymers by sequential electrostatic deposition technique. The phenyl phosphine oxide containing aromatic diamines m-DAPPO, BATFPO, and p-BAPPO, were selected because of their high thermo-oxidative stability, high glass transition temperature, and potential for fire retardant behavior of phosphorous containing polymers. The initial exposure of such polymers to atomic oxygen is expected to result in a passivating phosphate glassy layer on the surface, preventing further the erosion/corrosion caused by atomic oxygen in a harsh thermal environment.

Fire retardant polymers provided herein can be used in any suitable product. In some cases, polymers provided herein can be a structural component, an adhesive, and/or a lubricant. In some cases, polymers provided herein can be applied to an object, such as a structural component, in order to improve the fire resistant properties of the object. Suitable structural components including polymers provided herein include structural components of buildings and/or vehicles, such as windows, wooden beams, and dry wall. In some cases, polymers provided herein can be included in medical devices. In some cases, polymers provided herein can be used to insulate electrical components (e.g. wire) or equipment. Polymers provided herein can have fire retardant properties. In some cases, polymers provided herein do not produce toxic gases when combusted. Polymers provided herein can be substantially free of bromine, chlorine, and/or halogens, which can produce harmful gasses if present in a combusted polymer.

In some cases, polymers provided herein can be formed using a layer-by-layer deposition (LbL) technique. The LbL technique is a highly controlled and broad-ranging method for creating multi-layered, uniform nano-architectures from two oppositely charged polymers. The poly(pyridinium) salts are positively charged polymers, they are appropriate partners to build up nanoscale layers can be built up with precise control simply by varying the nature of negatively charged polymers. There are many negatively charged polymers both synthetic type (man-made), e.g., polystyrene sulfonates, and natural biopolymers, e.g. DNA. During LbL deposition, counterions can be washed away from positively and negatively charged polymers. Thickness, surface charge, and composition can be controlled through changing the nature of anionic polymers, the dip/wash cycles and the reaction conditions. Additionally, various morphologies can be achieved by changing the architectures of the underlying the substrate templates. In some cases, an LbL deposited polymer provided herein can be used as a membrane. In some cases, an LbL polymer membrane provided herein can be used for drug delivery, gene transfection, electrical stimulation for neural stem cells, or tissue engineering. In some cases, a biosensor can include an LbL polymer membrane provided herein.

Exemplary embodiments of the present disclosure are provided in the following examples. The examples are presented to illustrate the inventions disclosed herein and to assist one of ordinary skill in making and using the same. These are examples and not intended in any way to otherwise limit the scope of the inventions disclosed herein.

Synthesis and Characterization of Monomers. The compound 4,4'-(1,4-phenylene)-bis(2,6-diphenylpyrylium) ditosylate monomer (compound M) was synthesized according to known procedures in two steps (Scheme 1). In the first step, terephthalaldehyde was condensed with acetophenone to afford the desired tetraketone, I. The product was then recrystallized from toluene to afford 38.0 g (89% yield) of off-white crystals of compound I. The chemical structure and purity of I were confirmed by elemental, $^1$H NMR, and differential scanning calorimetry (DSC) (melting endotherm at 206° C.) analyses.

In the second step (Scheme 1), tetraketone I was subsequently cyclodehydrated to monomer M by treatment with triphenylmethyl tosylate, which is a hydride acceptor. This hydride acceptor was generated in situ from triphenylmethanol and tosic acid. The product was collected by filtration, washed carefully with $(CH_3CO)_2O$ and ethanol, then recrystallized from acetic acid, and was obtained as yellow crystals of the desired 4,4'-(1,4-phenylene)-bis-(2,6-diphenylpyrylium) ditosylate monomer with a 75% yield. The chemical structure and purity of compound M were confirmed by $^1$H and $^{13}$C NMR and elemental analyses. The NMR peak positions and the integration ratio between the aromatic protons and the aliphatic protons were in excellent agreement with calculated values of the compound. Several endotherms by DSC analyses were observed at 161 (Tm), 195, and 304° C. (Ti) that matched previously reported values.

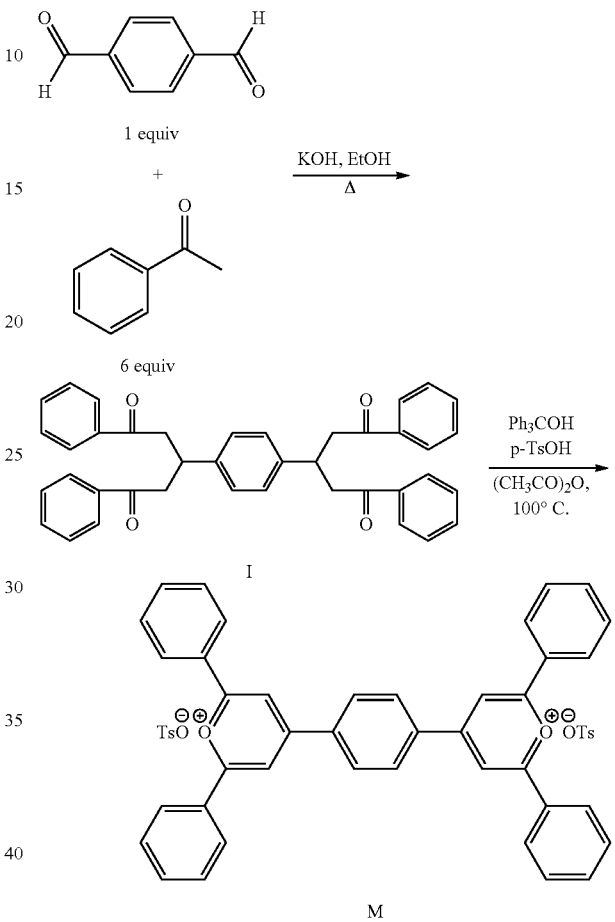

Scheme 1. Synthesis of 4,4'-(1,4-phenylene)-bis(2,6-diphenylpyrylium) ditosylate monomer (compound M).

Bis(3-aminophenyl)phenyl phosphine oxide (m-DAPPO) was synthesized by a two-step process as shown in Scheme 2. In the first step, triphenyl phosphine oxide (TPO), II, was reacted with 90% fuming $HNO_3$ and 96% $H_2SO_4$ to afford bis(3-nitrophenyl)phenyl phosphine oxide (m-DNPPO). The crude product was dried in vacuum and recrystallized twice from ethanol and was obtained m-DNPPO (65% yield). Elemental and $^1$H NMR analyses confirmed the chemical structure and high purity of m-DNPPO.

In the second step, bis(3-aminophenyl)phenyl phosphine oxide (m-DAPPO) was prepared by the reduction of m-DNPPO using stannous chloride. This method was routinely used for the synthesis of this diamine, since the reduction with hydrogen over Pd/C in a hydrogenation shaker produced a lower yield of product (28%). The solid crude product was filtered, washed with water until neutral, and recrystallized from chloroform to give m-DAPPO in an 84% yield. The chemical structure and high purity of m-DAPPO were also confirmed by elemental, $^1$H and $^{13}$C NMR analyses. DSC thermograms of m-DAPPO were obtained at heating and cooling rates of 10° C./min in nitrogen. In the first heating cycle, the peak maximum of the melting endotherm was 208° C., which agreed well with the reported value of the melting point (mp=203° C.).

Scheme 2. Synthesis of bis(3-aminophenyl) phenyl phosphine oxide (m-DAPPO).

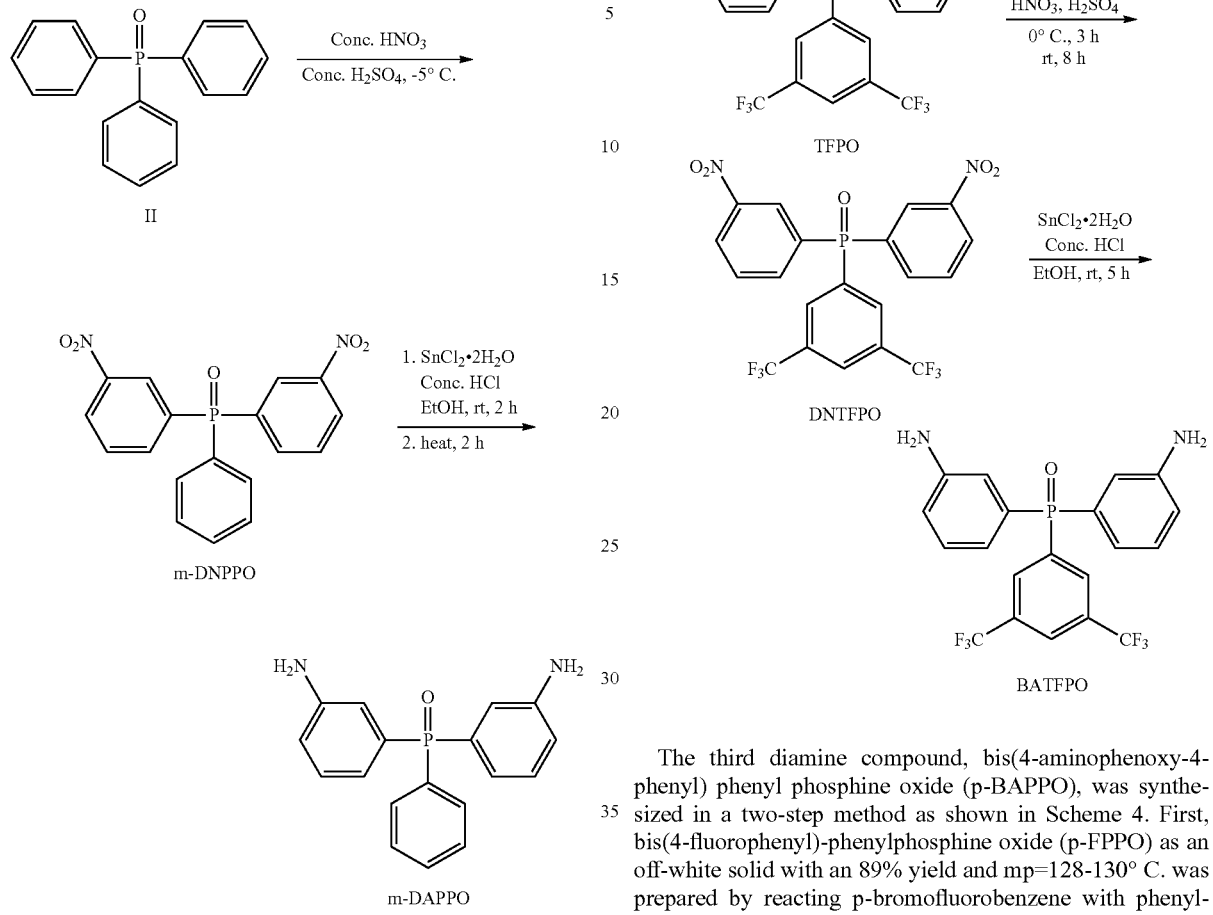

Scheme 3 outlines the synthesis of bis(3-aminophenyl)-3,5-bis(trifluoromethyl)phenyl phosphine oxide (BATFPO). This diamine was synthesized via a Grignard reaction prepared from 3,5-bis(trifluoromethyl)bromobenzene with diphenylphosphinic chloride, followed by nitration and reduction reactions. The solid crude product was filtered and washed with copious amounts of water until neutral, to provide a crude product of BATFPO, which was air-dried. It was then further purified by sublimation to afford pure BATFPO in an 86% yield. $^1$H and $^{13}$C NMR spectra and elemental analyses confirmed its chemical structure and purity. It showed a Tm at 228° C. with ΔH=9.0 kcal/mol in the first heating cycle of the DSC thermogram (lit. mp=226-227° C.).

Scheme 3. Synthesis of bis(3-aminophenyl)-3,5-bis(trifluoromethyl) phenyl phosphine oxide (BATFPO).

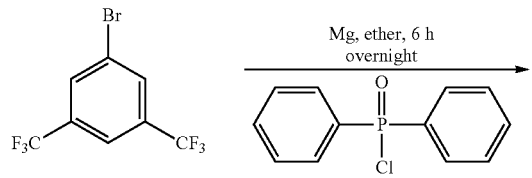

The third diamine compound, bis(4-aminophenoxy-4-phenyl) phenyl phosphine oxide (p-BAPPO), was synthesized in a two-step method as shown in Scheme 4. First, bis(4-fluorophenyl)-phenylphosphine oxide (p-FPPO) as an off-white solid with an 89% yield and mp=128-130° C. was prepared by reacting p-bromofluorobenzene with phenylphosphonic dichloride in the presence of magnesium in tetrahydrofuran (THF).

In the second step, p-FPPO was reacted with 4-aminophenol in the presence of $K_2CO_3$ in N,N-dimethyl acetamide (DMAc) to afford p-BAPPO. The crude product was purified by column chromatography over silica gel eluting with 2% methanol-ethyl acetate to furnish p-BAPPO as an off-white solid powder with an 82% yield. The chemical structure was confirmed by $^1$H and $^{13}$C NMR and DSC analyses (mp=98-100° C.).

Scheme 4. Synthesis of bis(4-aminophenoxy-4-phenyl) phenyl phosphine oxide (p-BAPPO).

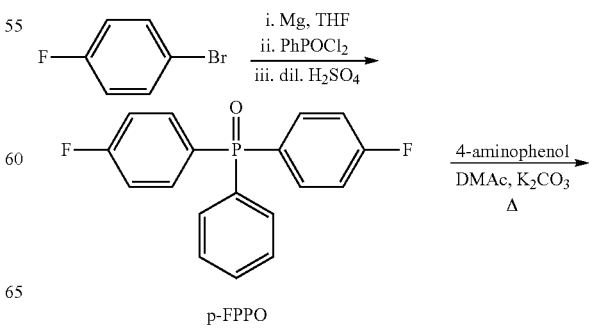

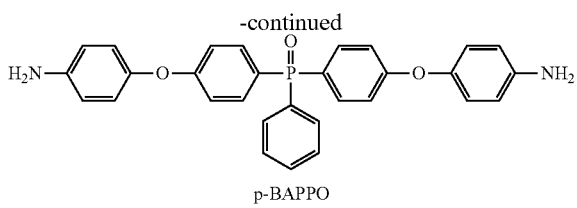

p-BAPPO

Synthesis and Characterization of Ionic Polymers. The phenyl phosphine oxide-containing poly(4,4'-(p-phenylene)-bis(2,6-diphenylpyridinium)) ionic polymer (P-1) was prepared by a ring-transmutation polymerization reaction as shown in Scheme 5. This polymerization reaction was essentially a polycondensation reaction between 4,4'-(1,4-phenylene)-bis(2,6-diphenylpyrylium) ditosylate monomer (compound M) and bis(3-aminophenyl)phenyl phosphine oxide (m-DAPPO), liberating water as a condensation product.

weight polymer. This polycondensation reaction was in contrast to other polycondensation reactions in which polymers usually precipitate out of solutions prematurely, thus limiting the maximum molecular weights of the polymers. Polymer P-1 was fully characterized by elemental analysis, $^1$H and $^{13}$C NMR, and gel permeation chromatography (GPC) analyses.

Figure 5A:
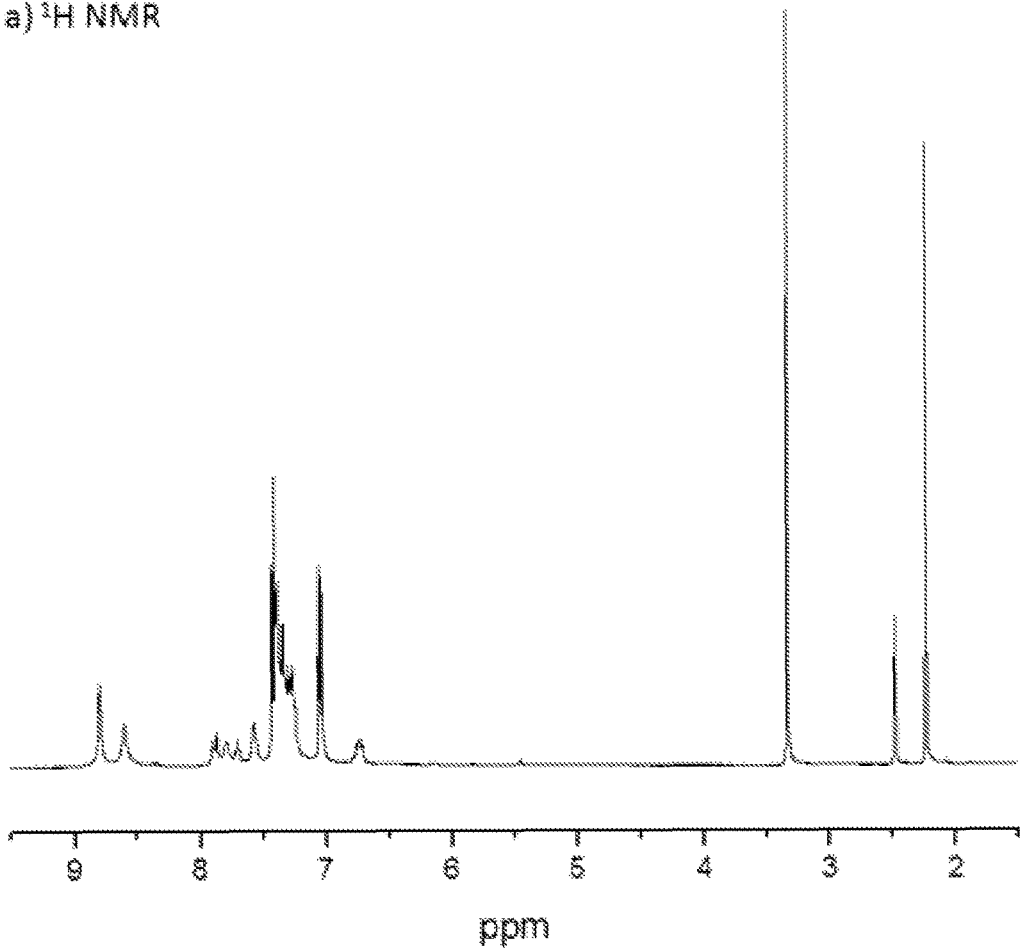
FIG. 5(a) and FIG. 5(b) show $^1$H and $^{13}$C NMR spectra, respectively, of an exemplary fire retardant polymer provided herein.
Figure 5B:
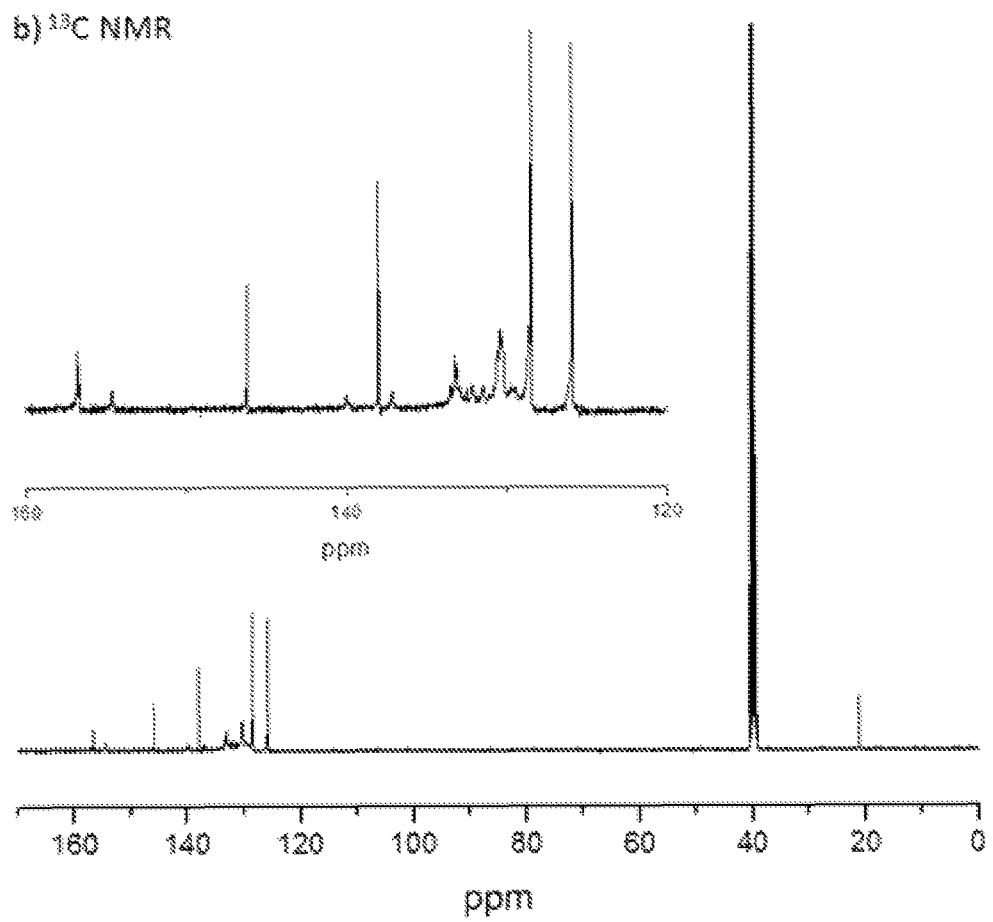

FIGS. 5(a) and 5(b) show the $^1$H and $^{13}$C NMR spectra of ionic polymer P-1 in $d_6$-DMSO at room temperature. Its $^1$H NMR spectrum showed unique resonances at δ=8.93 and 8.70 ppm for the protons of the aromatic moieties of bispyridinium salts and a set of resonances at δ=7.44 and 7.05 and 2.25 ppm for the protons of the aromatic moiety and methyl group in the tosylate counterion. The relative integration ratio of all aromatic protons (49H) and aliphatic protons (6H) is in excellent agreement with the calculated value obtained from those in the repeating unit of this polymer. Its $^{13}$C NMR spectrum contained both aliphatic and aromatic carbon signals at appropriate chemical shifts, as expected.

Scheme 5. Synthesis of poly(4,4'-(p-phenylene)-bis(2,6-diphenylpyridinium))polymers P-1, P-2 and P-3 using a ring-transmutation polymerization reaction.

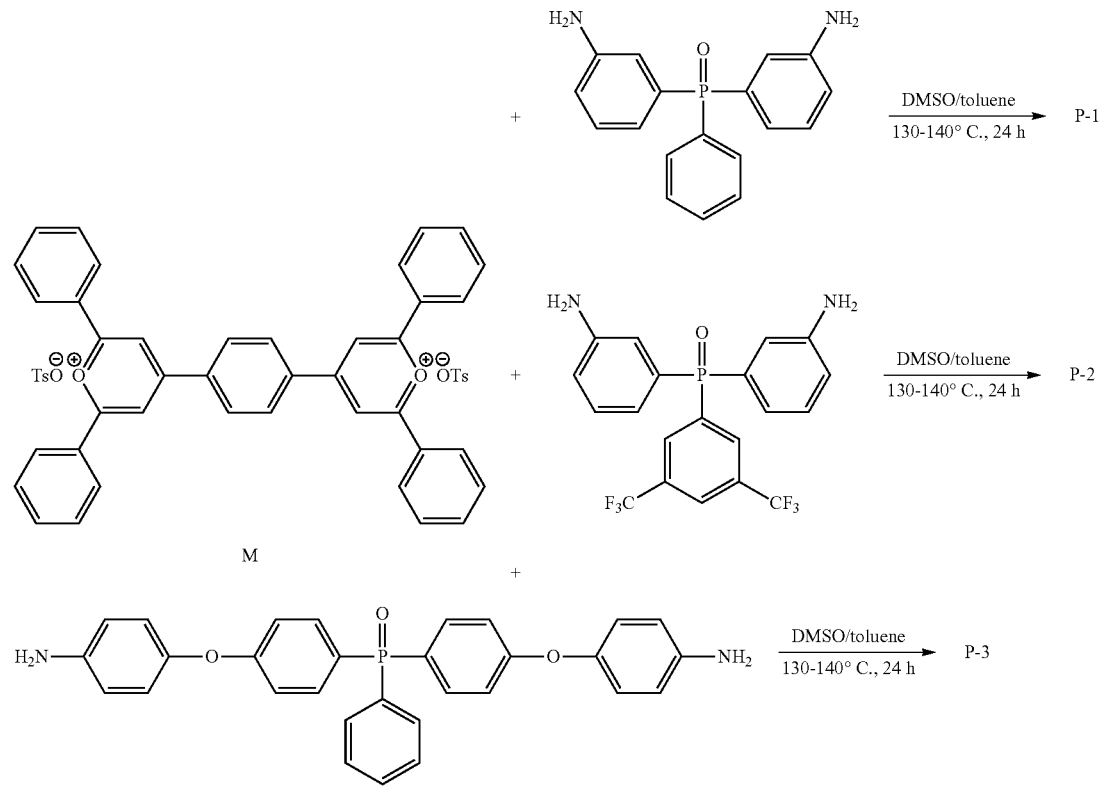

Figure 6A:
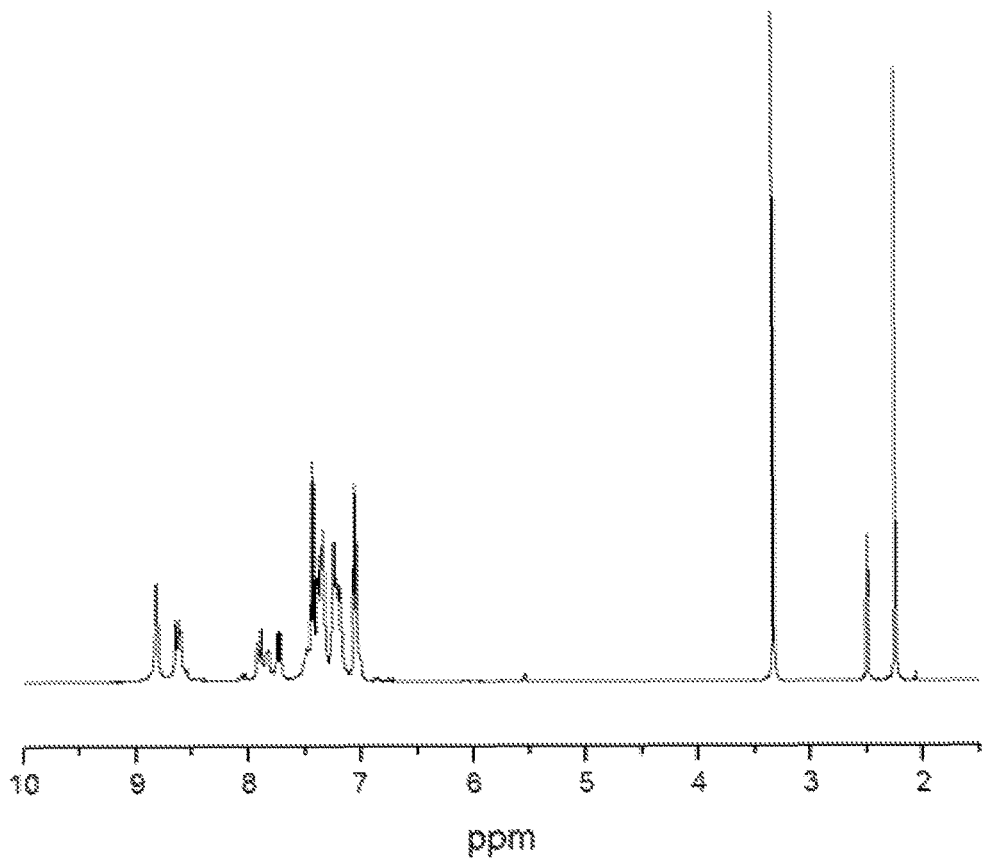
FIGS. 6(a) and 6(b) show $^1$H and $^{13}$C NMR spectra, respectively, of an additional exemplary fire retardant polymer provided herein.
Figure 6B:
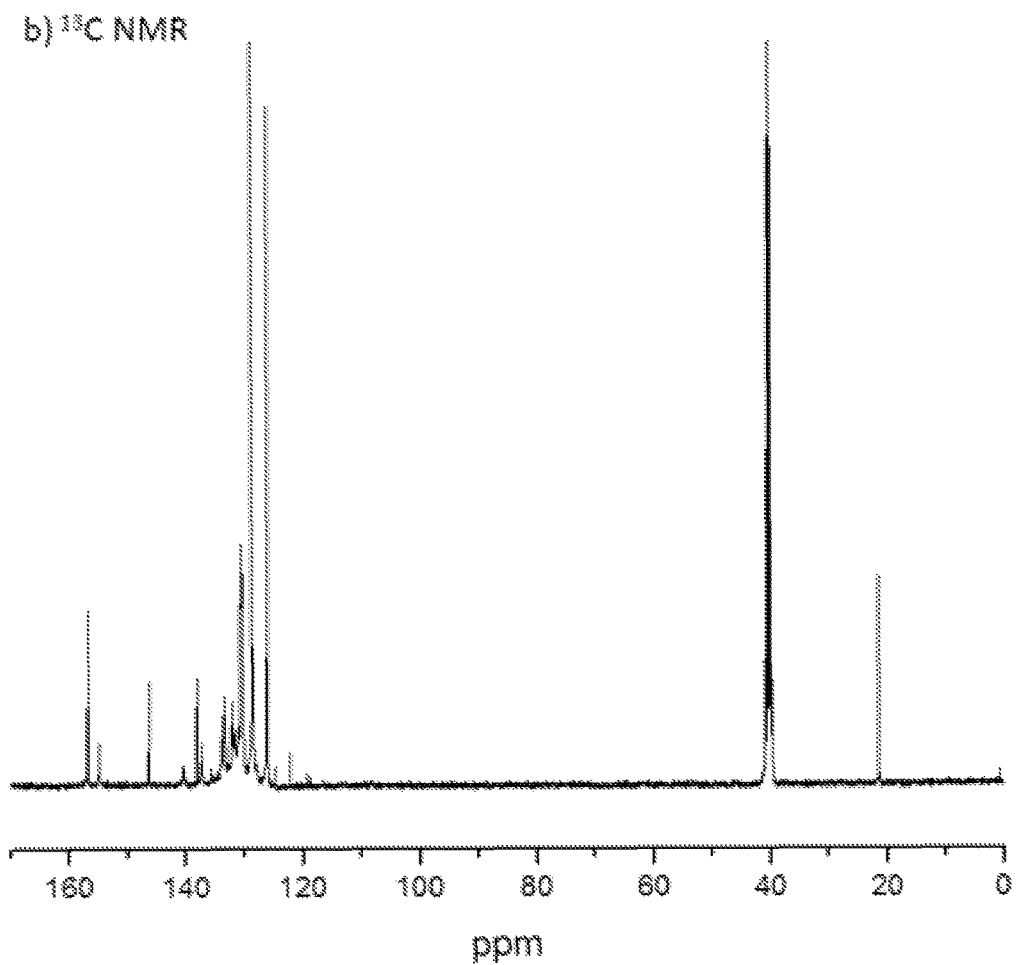

Compound M was polymerized with m-DAPPO on heating in the non-volatile, non-toxic, water miscible solvent dimethyl sulfoxide (DMSO) at 130-140° C. for 24 h. The water, the condensation product generated during the polymerization, was distilled out from the reaction medium as a toluene/water azeotrope. The yellowish solid ionic polymer P-1 was isolated by two cycles of precipitation with distilled water and dissolution in methanol. Its yield of 77-80% with high purity was achieved after purification. It should be noted that the reaction medium was maintained as a homogeneous solution throughout the entire polymerization reaction period, thus permitting the production of high molecular Using similar ring-transmutation polymerization reaction (as shown in Scheme 5) and purification processes, ionic polymers P-2 and P-3 were obtained by polymerizing compound M with the corresponding diamines (BATFPO and p-BAPPO) in DMSO at 130-140° C. for 24 h with yields of 77% (yellow solid) and 79% (dark brown solid), respectively. The chemical structures of both the ionic polymers P-2 and P-3 were also confirmed by elemental, $^1$H and $^{13}$C NMR spectra analyses. FIGS. 6(a) and 6(b) show the $^1$H and $^{13}$C NMR spectra of polymer P-2 in $d_6$-DMSO taken at room temperature. Like the analysis of $^1$H NMR spectrum of polymer P-1 (vide supra), its relative integration ratio of the aromatic protons (47H) and aliphatic protons (6H) is in excellent agreement with the calculated value obtained from those in the repeating unit of this polymer. Its $^{13}$C NMR spectrum also contained both aliphatic and aromatic carbon signals at appropriate chemical shifts, as expected.

Additional ionic polymers were prepared by simple metathesis reaction of the respective primary ionic polymers in the presence of a desired ion, as shown in Scheme 6. This reaction leads to exchange of the original tosylate ions with newly introduced ions. Using this metathesis reaction, ionic polymers P-4, P-5 and P-6 were prepared with high yield (95%) and purity from the respective ionic polymers P-1, P-2 and P-3 by exchanging the tosylate ions with triflimide ions. Note here that although ionic polymers with the triflimide ion can be made directly from a triflimide-modified monomer M, handling of the very acidic bistrifluoromethanesulfonyl imide counterion that would be required is very inconvenient.

Scheme 6. Metathesis reaction for the conversion of ionic polymer P-1 to P-4.

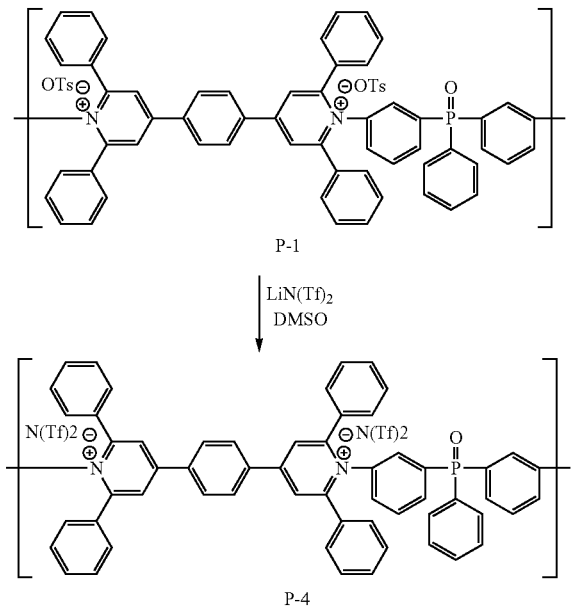

The chemical structures and purities of P-4, P-5 and P-6 ionic polymers were confirmed by elemental, $^1$H and $^{13}$C NMR spectra analyses. The facile ring-transmutation polymerization eliminates the need for extreme purification of the monomers or of the final polymers. The purification of this class of polymers was conveniently performed by simple dissolution and precipitation in benign solvents including water. Furthermore, this polymerization requires no special pieces of glassware, no special catalysts, and no rigorous exclusion of moisture, which will enable the scale-up for the synthesis of this class of ionic polymers. Thus, these high temperature tolerant ionic polymers represent an attractive alternative to reduce their impact on the environment and pollution. The metathesis reaction offers excellent potential for low-cost mass production of a range of ionic polymers with tunable properties.

Molecular Weight and Solubility. The number-average molecular weights (Mns) of the ionic polymers ranging from 36 to 65 kDa are summarized in Table 1. Importantly, the polydispersity index (PI) is low (<1.73) in comparison to other commercially available polymers that have much wider molecular weight distributions. This property provides the polymers with very specific properties that can be tailored for various applications. Based on the molecular weight data of the ionic polymers, the ring transmutation polymerization reaction appeared to be quite effective for synthesizing high molecular weight phosphorous containing ionic polymers.

TABLE 1

Thermal properties and GPC data of ionic polymers P-1 to P-6

| Polymer | Tg (° C.) | Td$^a$ (° C.) | Char Yield at 700 (° C.) (%) | GPC Results Mn (Da) | PI |
|---|---|---|---|---|---|
| P-1 | 270 | 348 | 52 | 36,559 | 1.49 |
| P-2 | 275 | 352 | 53 | 51,261 | 1.29 |
| P-3 | 258 | 343 | 49 | 64,545 | 1.31 |
| P-4 | 253 | 439 | 54 | 43,933 | 1.73 |
| P-5 | 231 | 418 | 47 | 53,783 | 1.50 |
| P-6 | 243 | 437 | 45 | 64,264 | 1.42 |

$^a$Td is the decomposition temperature at which mass of the polymer was reduced by 5 wt % of the original.

The molecular weight of the polymers can be adjusted by utilizing non-stoichiometric ratios of the bispyrylium monomer and diamine in the polymerization reaction. In terms of solubility, P-1, P-2 and P-3 ionic polymers were found to be readily soluble in methanol, ethanol and acetonitrile. Polymers P-4, P-5 and P-6, on the other hand, are soluble in acetone and acetonitrile. However, they have no or very poor solubility in water, propanol, toluene, chloroform, tetrahydrofuran and dichloromethane, suggesting that these polymers have high resistance to water, water vapor, and organic gases, as required for their use as coatings and structural component materials.

Figure 7A:
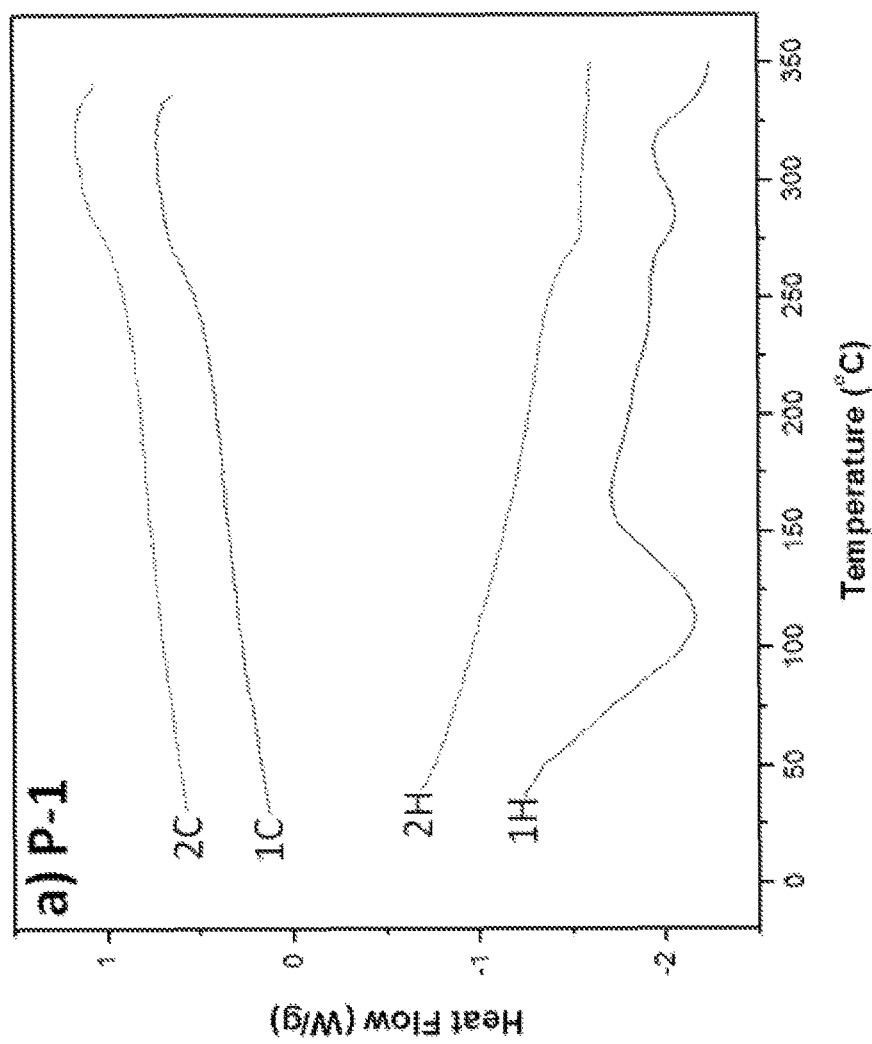
FIGS. 7(a)-7(c) depict DSC thermograms of three exemplary fire retardant polymers provided herein.
Figure 7B:
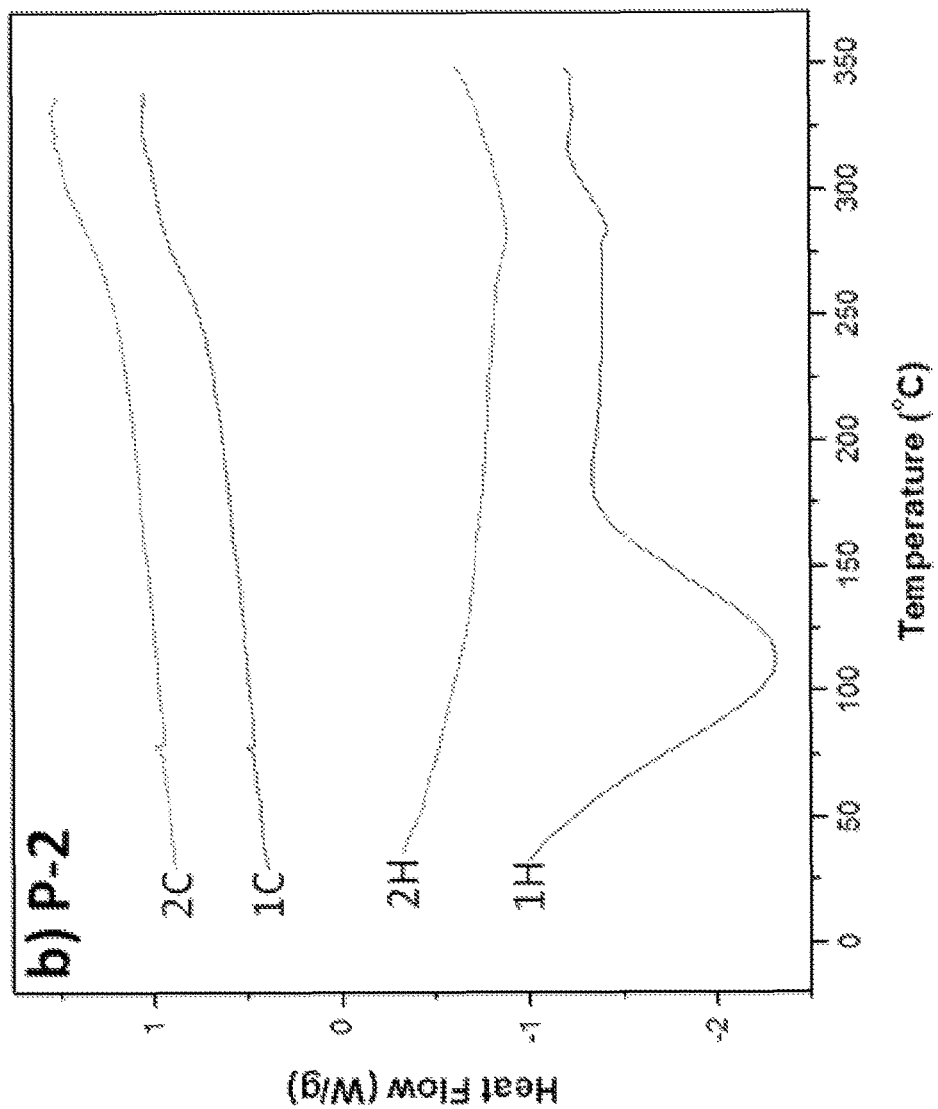
Figure 7C:
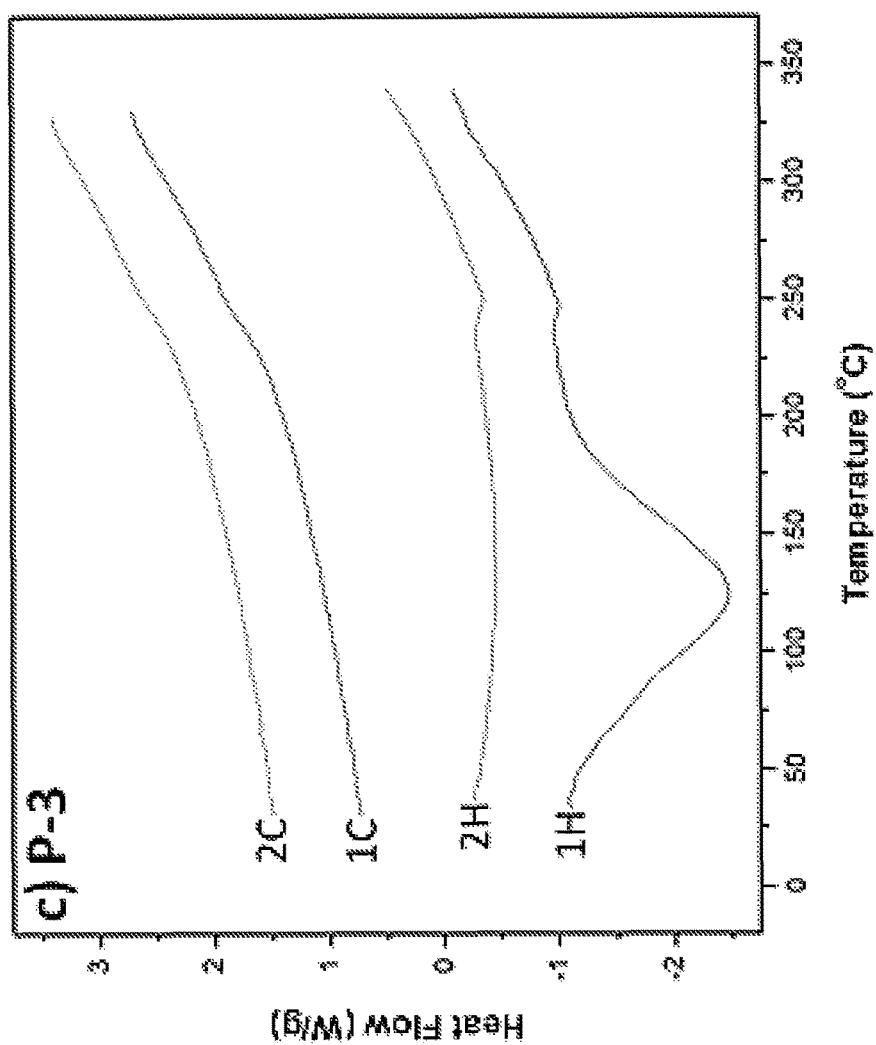

Thermal Properties. To determine the thermal properties of the ionic polymers, differential scanning calorimetry (DSC) and thermogravimetric analysis (TGA) were performed at heating and cooling rates of 10° C./min and at a heating rate of 10° C./min in nitrogen, respectively. The DSC thermograms of ionic polymers P-1, P-2 and P-3 are shown in FIGS. 7(a), 7(b) and 7(c). A broad endotherm at 112° C. due to solvent loss was observed in the first heating cycle of the DSC thermogram of P-1 (FIG. 7a), while no such endotherm was observed in the second heating cycle. A high glass transition temperature, Tg=276° C., of P-1 was evident in its DSC thermograms. However, with further heating, an exotherm was observed after the Tg at 320° C., due to cold crystallization. A glass transition temperature of 275° C. was observed for P-2 (FIG. 7b), whereas no cold crystallization endotherm was observed at a higher temperature up to 350° C. For P-3, a glass transition temperature of Tg=243° C. was observed (FIG. 7c). For triflimide counterions containing ionic polymers P-4, P-5, and P-6, Tg in the range 230-253° C. was observed by DSC analysis. Depending on the chemical structures of the polymers, the Tg ranged from 231 to 275° C. (Table 1). These results indicate that these ionic polymers have high Tg values.

Figure 8A:
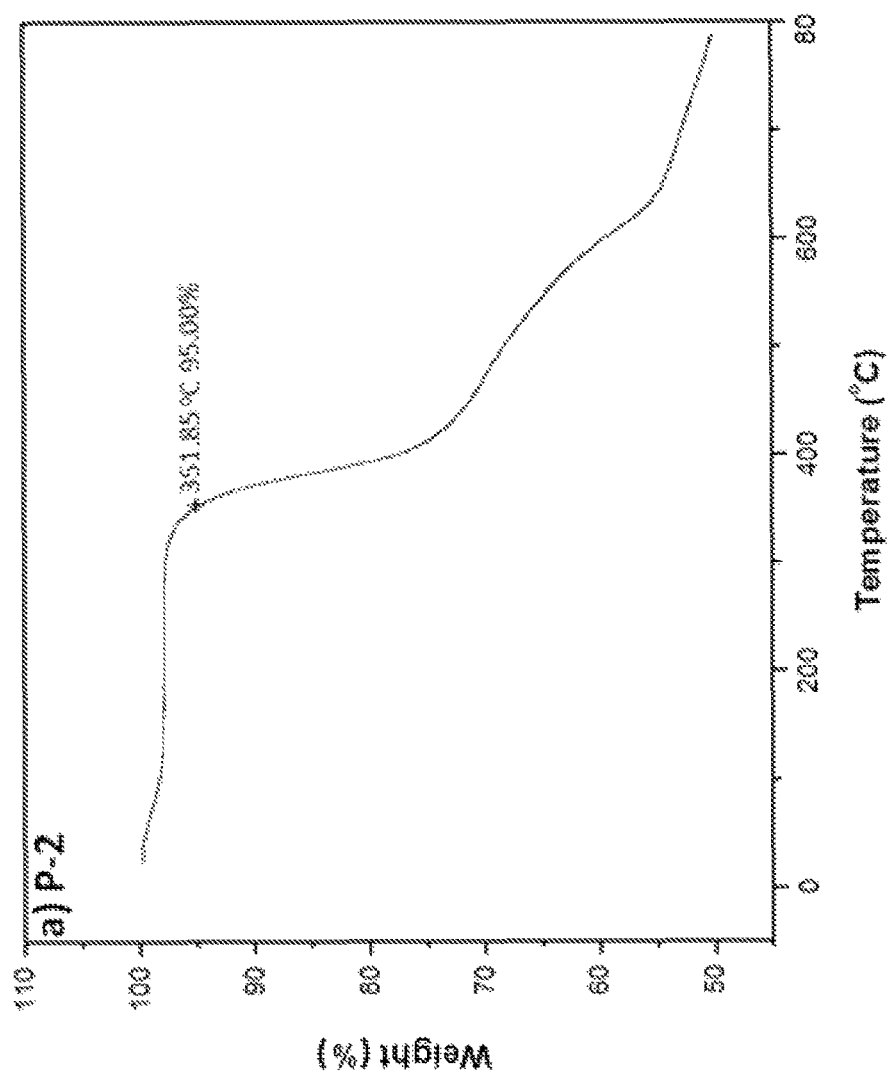
FIGS. 8(a) and 8(b) show TGA plots of two representative fire retardant polymers provided herein.
Figure 8B:
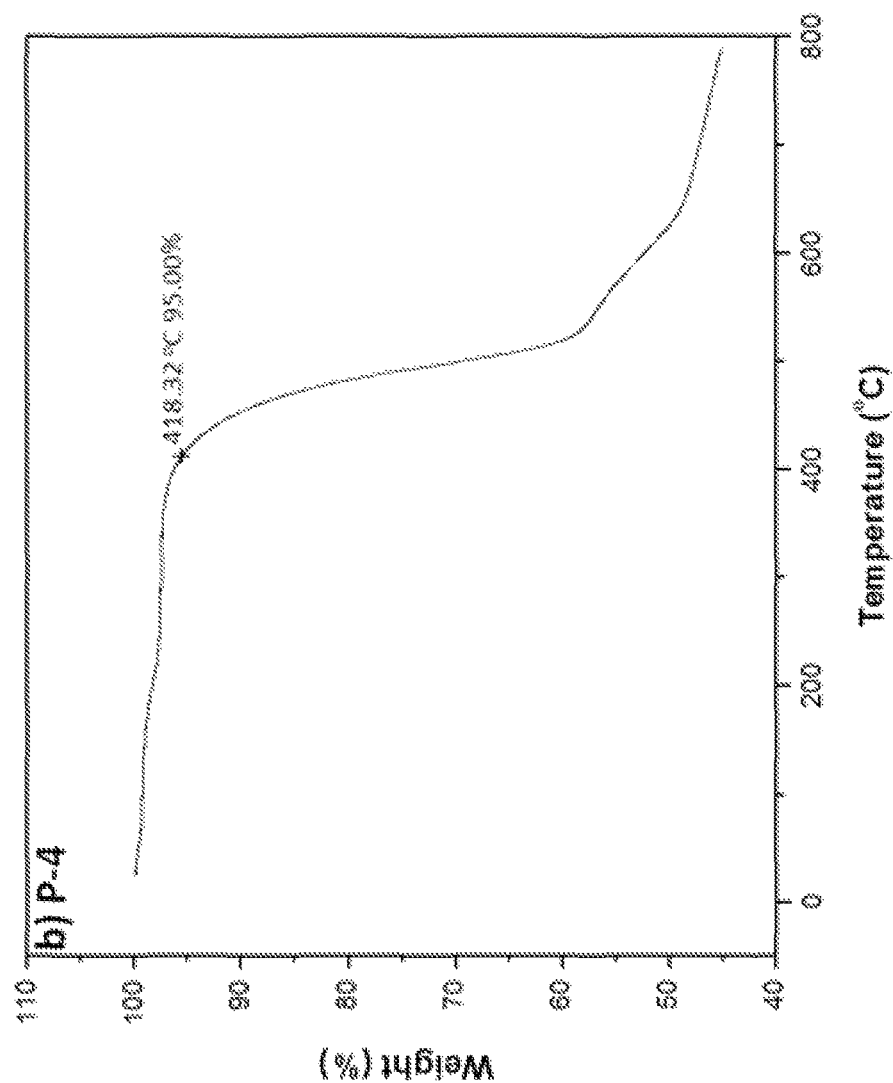

FIGS. 8(a) and 8(b) show TGA plots of two representative ionic polymers P-2 and P-4 obtained at a heating rate of 10° C./min in nitrogen. Decomposition temperatures (Tds) of the ionic polymers are also compiled in Table 1. The Td values were found to be in the temperature range 343-352° C. for the tosylate counterions containing ionic polymers (P-1, P-2 and P-3), and 418-439° C. for triflimide counterions containing ionic polymers (P-4, P-5, and P-6), at which only a 5% weight loss of all six ionic polymers occurred. These decomposition temperatures are more than 100° C. higher than that of a poly(p-phenylene-diphenylpyridinium) ionic polymer (245° C.) that does not contain a phosphine oxide moiety. In general, polymers containing the tosylate counterions have a higher Tg but a lower Td compared to those containing triflimide counterions due to the high thermal stability of the fluorinated anion. The TGA analyses also revealed that all six ionic polymers (P-1 to P-6) have high char yield at 700° C. (52% for P-1, 53% for P-2, 49% for P-3, 54% for P-4, 47% for P-5, and 45% for P-6). These results suggest that these ionic polymers have high Td values and char yields.

Processing, Moisture and Vapor Resistance, Optical/Fluorescence Properties, Thin Films, Adhesion, Mechanical and Tensile Strength. The ionic polymers P-1, P-2 and P-3 were found to be readily soluble in methanol, ethanol, and acetonitrile, whereas P-4, P-5 and P-6 are soluble in acetone and acetonitrile because of different counterion triflimide ion. However, all of these ionic polymers have no or very poor solubility in water, propanol, toluene, chloroform, tetrahydrofuran, and dichloromethane. The solubility profiles of these ionic polymers are summarized in Table 2. These results indicate that the phosphine oxide-containing ionic polymers have high resistance to moisture, water vapor and organic gases, which are pre-requisite criteria for coatings and structural component materials.

TABLE 2

Solubility profiles of ionic polymers P-1 to P-6 in different solvents

| Solvent | P-1 | P-2 | P-3 | P-4 | P-5 | P-6 |
|---|---|---|---|---|---|---|
| $H_2O$ | + – | – | – | – | – | – |
| MeOH | + | + | + | – | – | – |
| EtOH | + | + | + | – | – | – |
| n-Propanol | + – | – | + – | + – | – | – |
| Acetone | + – | + – | + – | + | + | + |
| Toluene | – | – | – | – | – | – |
| $CHCl_3$ | – | + – | + – | – | + – | – |
| THF | – | + – | + – | – | + – | – |
| $CH_2Cl_2$ | – | + – | + – | – | – | – |
| $CH_3CN$ | + | + | + | + | + | + |

+ = Soluble,
+ – = Slightly soluble,
– = Insoluble

Figure 9:
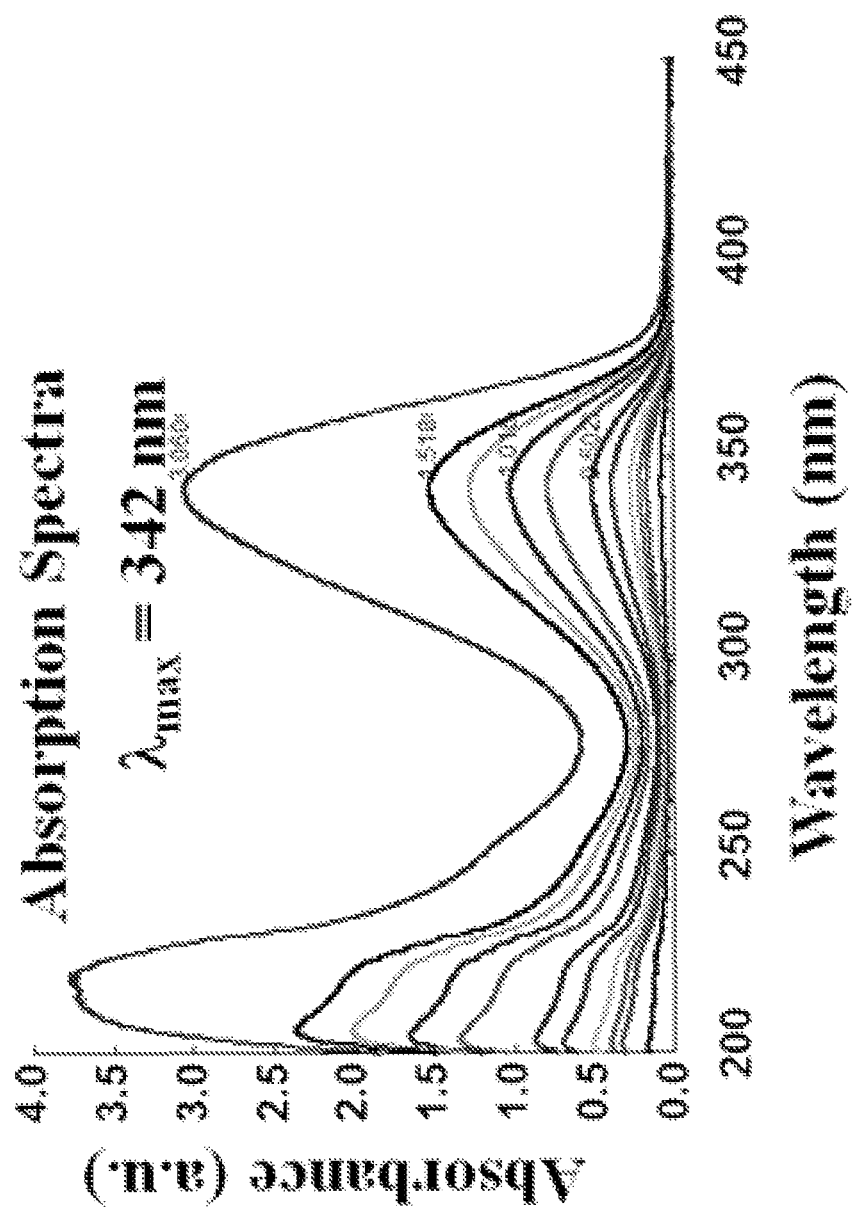
FIG. 9 shows an optical absorption spectrum of an exemplary fire retardant polymer provided herein.
Figure 10:
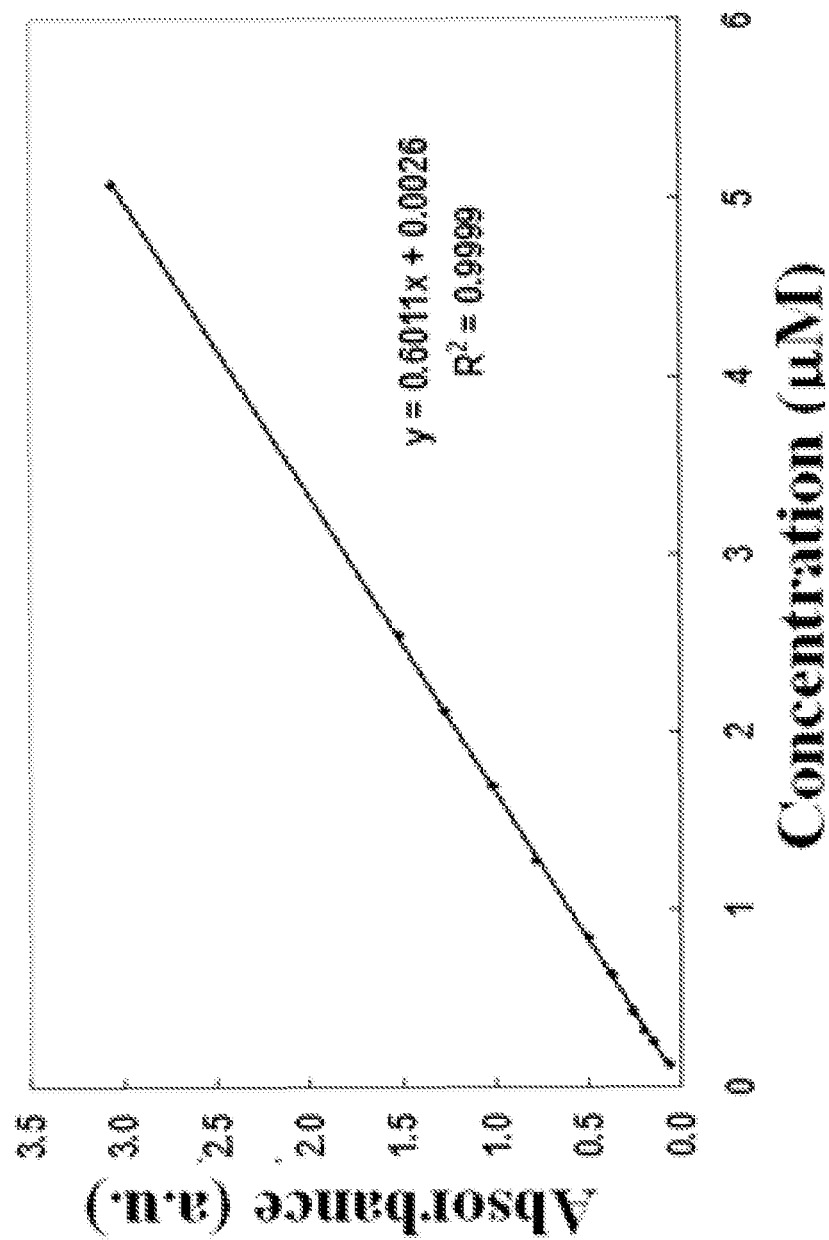
FIG. 10 shows a graph of the optical absorption vs concentration for an exemplary fire retardant polymer provided herein.
Figure 11:
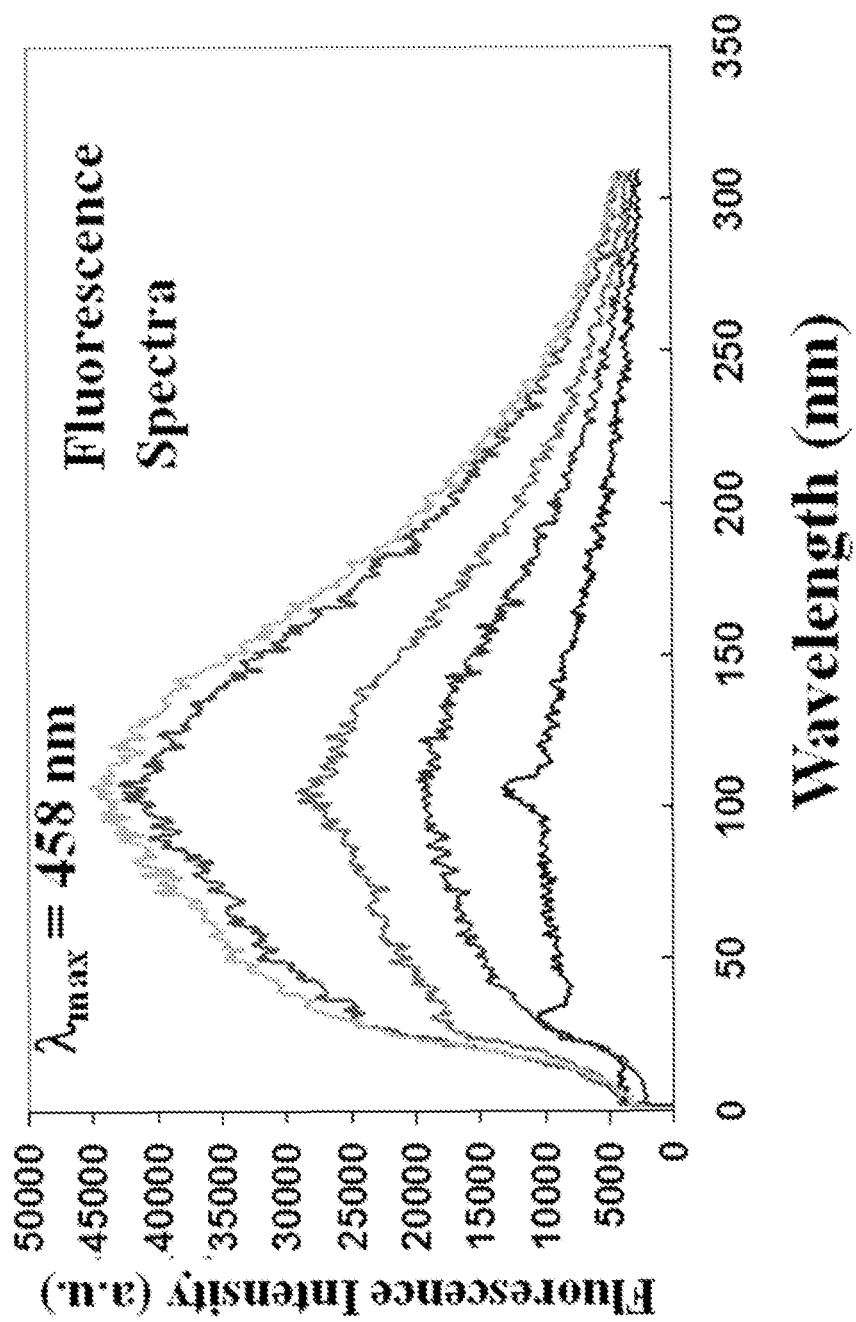
FIG. 11 shows a fluorescence spectrum of an exemplary fire retardant polymer provided herein.

The optical absorption and fluorescence properties of these ionic polymers were examined using a Shimadzu UV-2401PC UV-Vis spectrophotometer and PTI Quanta-Master™ Model QM-4/2005 spectrofluorometer, respectively. FIGS. 9-11 show absorption and fluorescence spectra of P-1 in methanol. The P-1 polymer absorbs in the UV-visible region (200-400 nm) with an absorption maximum ($\lambda_{max}$) at 342 nm, which is due to a π-π* transition. P-1 has a high molar absorption coefficient (~105 $M^{-1}$ $cm^{-1}$) and shows a linear dependence with concentration. In methanol solution, P-1 polymer emits blue light with a peak maximum at 458 nm. Similar optical absorption and fluorescence properties in methanol solution were also observed for ionic polymers P-2 to P-6. These polymers were found to absorb light in the wavelength range of 200-400 nm, and to emit light in the UV-visible range (350-650 nm). Both absorption and emission intensities increase linearly with the increased polymer concentration between 0.1 and 5 µM.

Figure 12A:
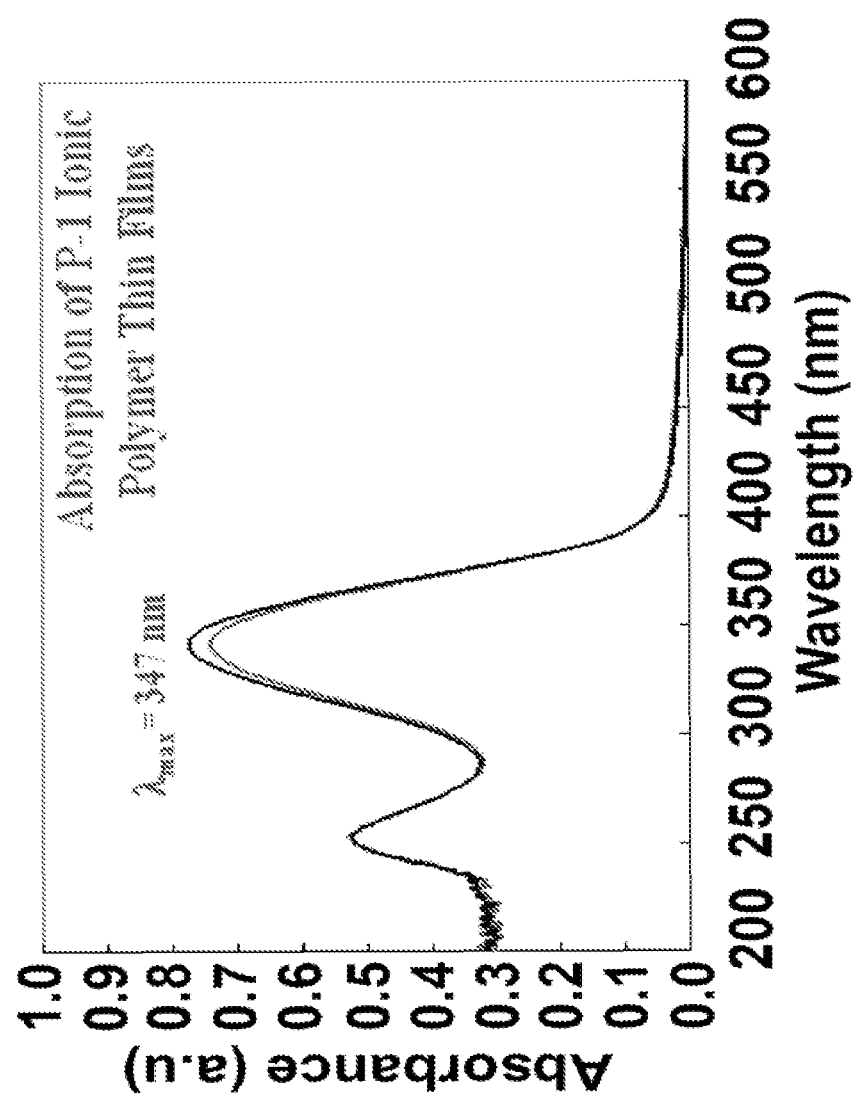
FIGS. 12(a) and 12(b) show absorption and fluorescence spectra, respectively, of thin films of an exemplary fire retardant polymer on glass substrates.
Figure 12B:
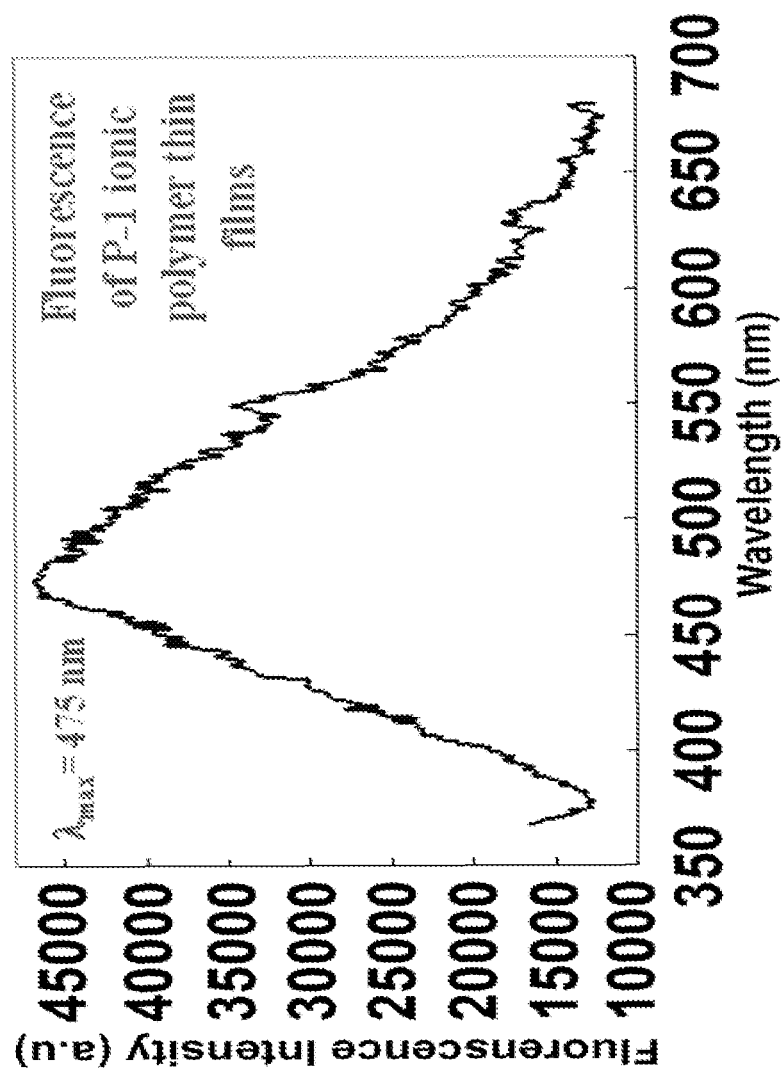
Figure 13:
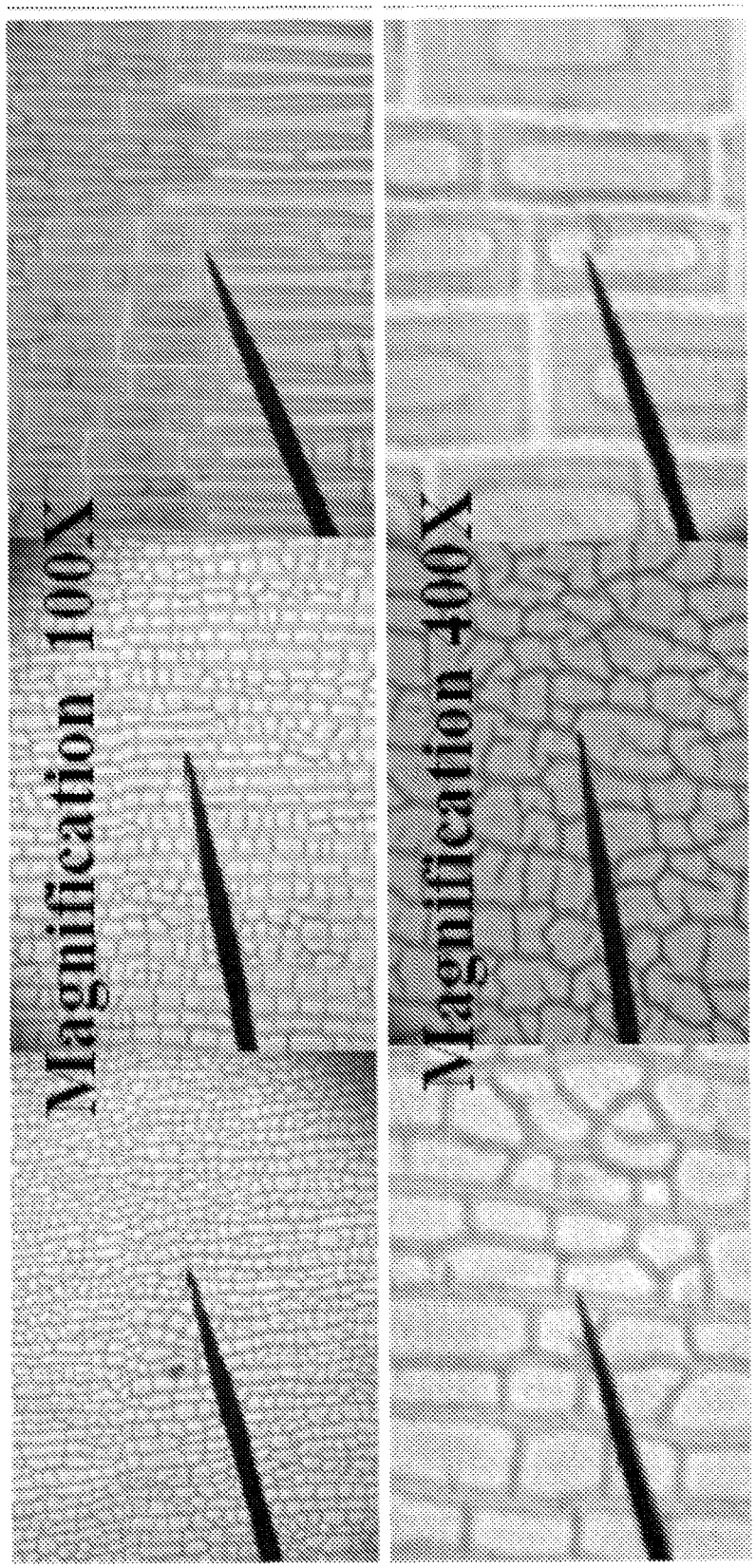
FIG. 13 depicts optical micrographs of thin films of an exemplary fire retardant polymer on glass substrates.

These ionic polymers have excellent thin-film forming properties. FIGS. 12(a) and 12(b) show representative absorption and fluorescence spectra of P-1 polymer thin films coated on glass substrates by spin coating. Thin films of P-1 to P-6 also absorb in the 200-400 nm regions with peaks at ~245 nm. They exhibit weak fluorescence, as expected. The thin films of the ionic polymers form aligned structures as observed by optical microscopy, as shown in FIG. 13.

Formation of aligned structures of the thin films of ionic polymers was further examined by atomic force microscope (AFM) analysis (discussed below). Due to the aligned structure, these ionic polymers can be used for enhancing performance of optoelectronic devices.

Figure 14:
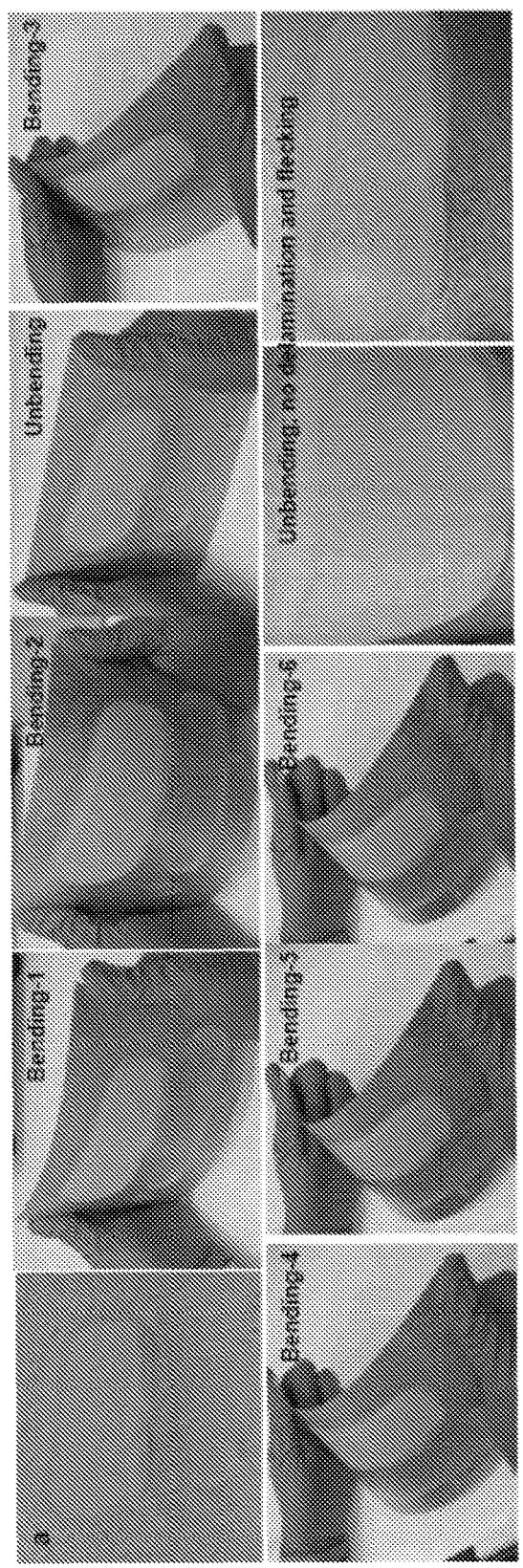
FIG. 14 depicts photographs of the bending of thin films of an exemplary fire retardant polymer on tin substrates.

To understand the adhesion, delamination, mechanical and tensile strength of the ionic polymers, large area thin films of the ionic polymers on metal substrates were prepared by spray coating. FIG. 14 shows photographs of large-area thin films of ionic polymer P-1 on tin metal substrates (without any surface treatment of the metal substrate) prepared by spray coating from methanol solutions. The approximate surface area of the P-1 film on the tin substrate was about 15 cm by about 7 cm. The approximate thickness of the P-1 film on the tin substrate was about 2-5 mµ.

The thin films retained their integrity even after bending and unbending the metal substrates at different angles. They also retained their integrity over at least about 4-5 months. No delamination and flecking of the thin films were observed while bending-unbending the metal substrates, as shown in FIG. 14. Similar properties were also observed for ionic polymers P-2 to P-6. These results suggest that they show excellent adhesion to metal substrates, high mechanical and tensile strength, and have excellent potential for applications in coating and/or as structural component materials for automobiles, aircrafts, engines, and power/propulsion systems.

Figure 15:
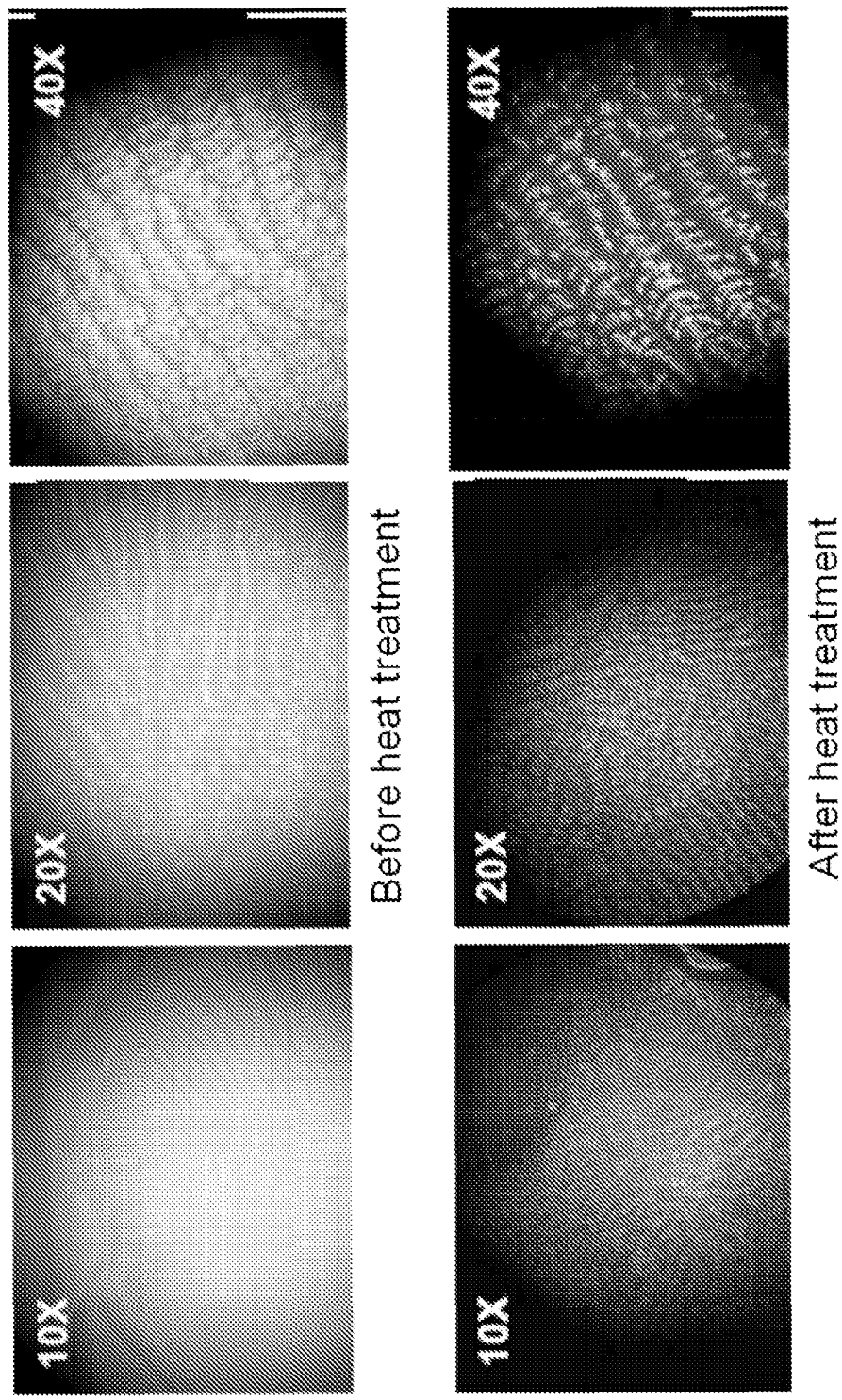
FIG. 15 depicts optical micrographs of thin films of an exemplary fire retardant polymer on glass substrates before and after high heat treatment.

High Temperature Heat Treatment and Morphologies of Thin Films. Thermal stability of the ionic polymers was also determined by heat treating their thin films at 500° C. in air, and probing their morphologies before (upper photos) and after the heat treatment (lower photos), as shown in FIG. 15. After heat treatment at 500° C. in air, a change of color of the thin films from yellow to brown was observed, which may be due to the formation of a glassy phosphate layer by the phosphine oxide group. However, no significant changes in the structural alignment of thin films for ionic polymers were observed.

For morphological studies, the thin films of ionic polymers were solvent cast from their methanol solution onto polished silicon substrates (1×1 cm), and dried at 60° C. under vacuum for 12 hours. Heat treated samples were prepared by heating the ionic polymer thin-films at 550° C. utilizing a hot plate. The approximate thickness of these films on the silicon substrate was about 1 mµ.

Figure 16:
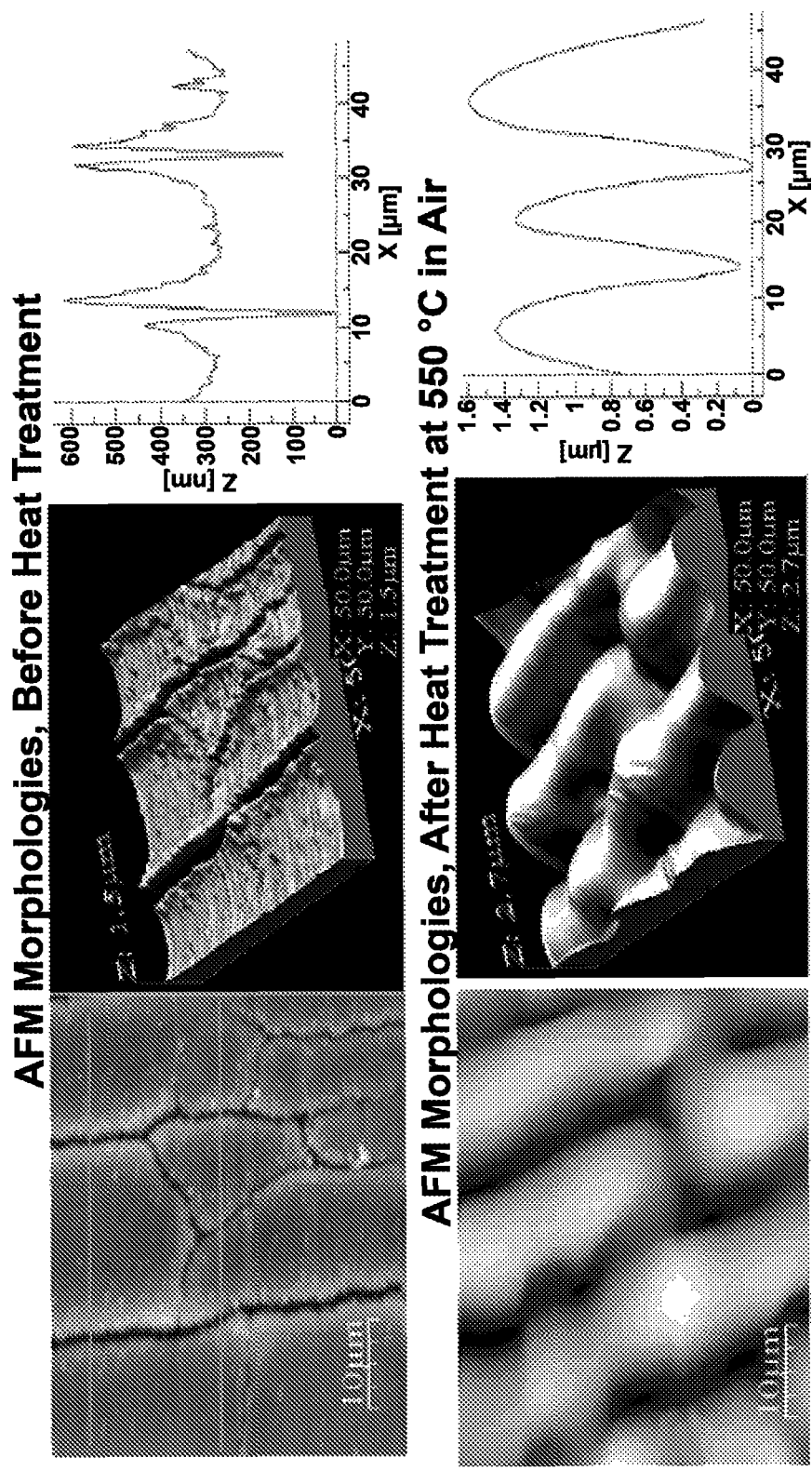
FIG. 16 depicts tapping-mode AFM height, 3D and cross-section images and data for an exemplary fire retardant polymer on glass substrates before and after high heat treatment.

AFM images were obtained using a Nano-Scope III microscope (Digital Instruments Inc., Veeco Metrology group, Santa Barbara, Calif.) in standard tapping mode with single silicon-crystal tip as nanoprobe. The Tapping-mode AFM height, 3D and cross-section images of the surface morphologies of P-1 ionic polymer thin films on silicon substrates before and after heat treatment are shown in FIG. 16. A root mean square (RMS) surface roughness of 0.08913 mµ/0.61544 mµ, average height of domains of 0.52786 mµ/1.81704 mµ, and maximum height of domains of 1.07694 mµ/3.11783 mµ were observed from the analysis of AFM results obtained from thin films of P-1 ionic polymer before (upper data in FIG. 16) and after (lower data in FIG. 16) heat treatment. Higher RMS surface roughness, average height of domains and maximum height of domains were observed after heat treatment for the P-1 films compared to the values before heat treatment, due to deformation of the surface morphology by the formation of glassy phosphate layers. Similar AFM morphological changes were also observed for the thin films of other ionic polymers P-2 to P-6 in the series.

Figure 17:
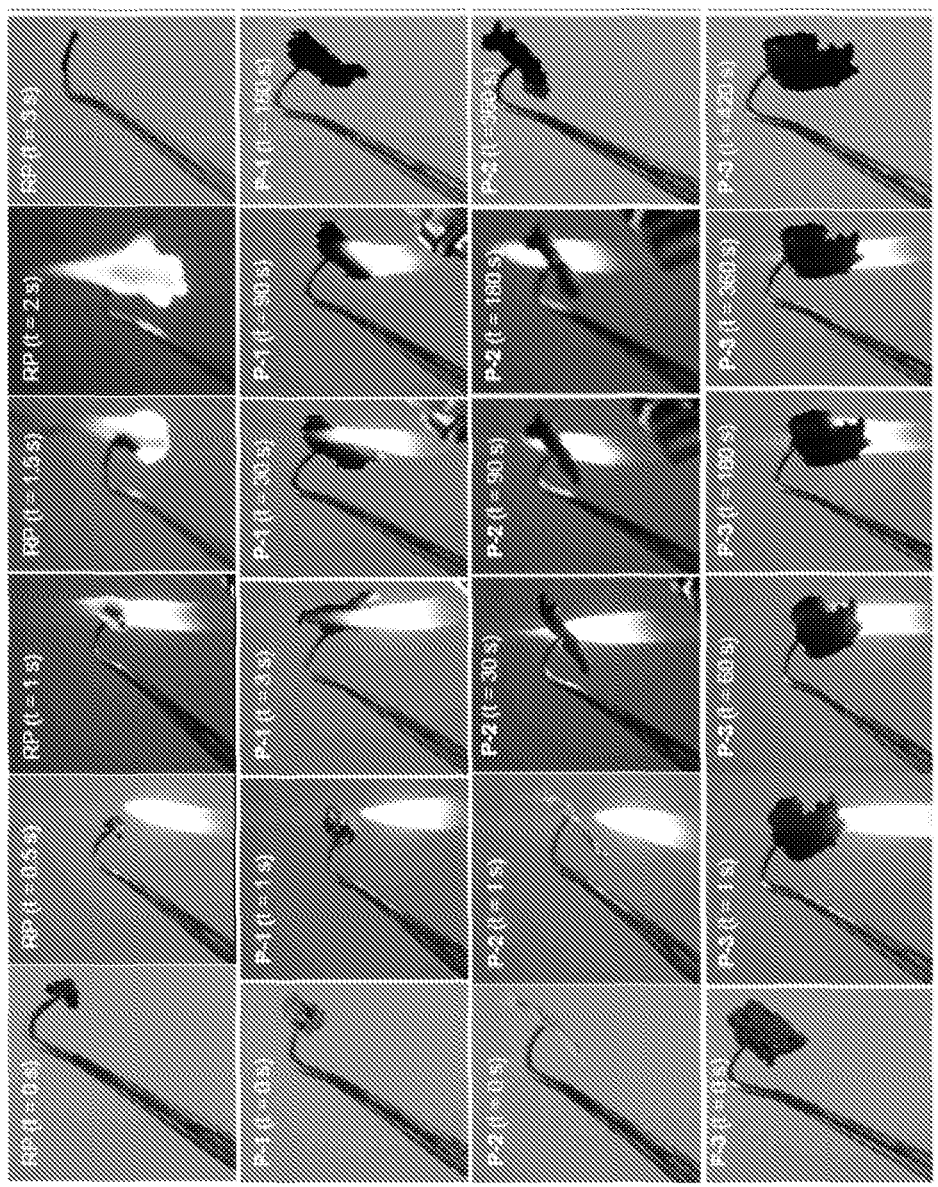
FIG. 17 depicts a series of photographs taken during direct flaming/combustion of a reference polymer (RP; top row) and exemplary fire retardant polymers (bottom three rows).

Fire Resistance and Retardant Properties. Fire resistance and retardant properties of the ionic polymers P-1 to P-6 and a reference polymer (RP), polythiophene, were investigated by direct flaming/firing them with a propane torch and probing their burning and/or flame ignition and retardant behavior, as shown in FIG. 17. The fire test for each of the ionic polymers was a vertical flame test based on the NASA Upward Flame Propagation Test (NASA Standard 6001 and ASTM D6413). All tests were conducted in a chemical hood utilizing an open design setup in a 20% ambient oxygen environment. All polymer samples were held firmly with a clean stainless steel hook. A clean piece of paper was placed below the polymer sample for easy viewing of any dripping. The polymer samples were then exposed to an ignition source at their bottom edge for 10 seconds to over 5 minutes. A propane torch was utilized as an igniter. All flame studies were videotaped so that the afterflame, afterglow and char formation times could be determined. The extent of melting and dripping were also recorded.

This consistent and repeatable method was used to evaluate the fire retardant properties of the polymer samples including reference polymer. Rapid responses to flame ignition (within a second) and complete burning within 2-3 seconds were observed for the RP polythiophene (FIG. 17). In the case of ionic polymers, no flaming, flame propagation, melting and dripping were observed by direct flaming with a propane torch for over 5 minutes although deformation and color change from yellow to dark due to char formation were observed. These results indicate that the phenyl phosphine oxide-containing ionic polymers (P-1 to P-6) developed herein exhibit excellent fire resistant and retardant properties.

Figure 18:
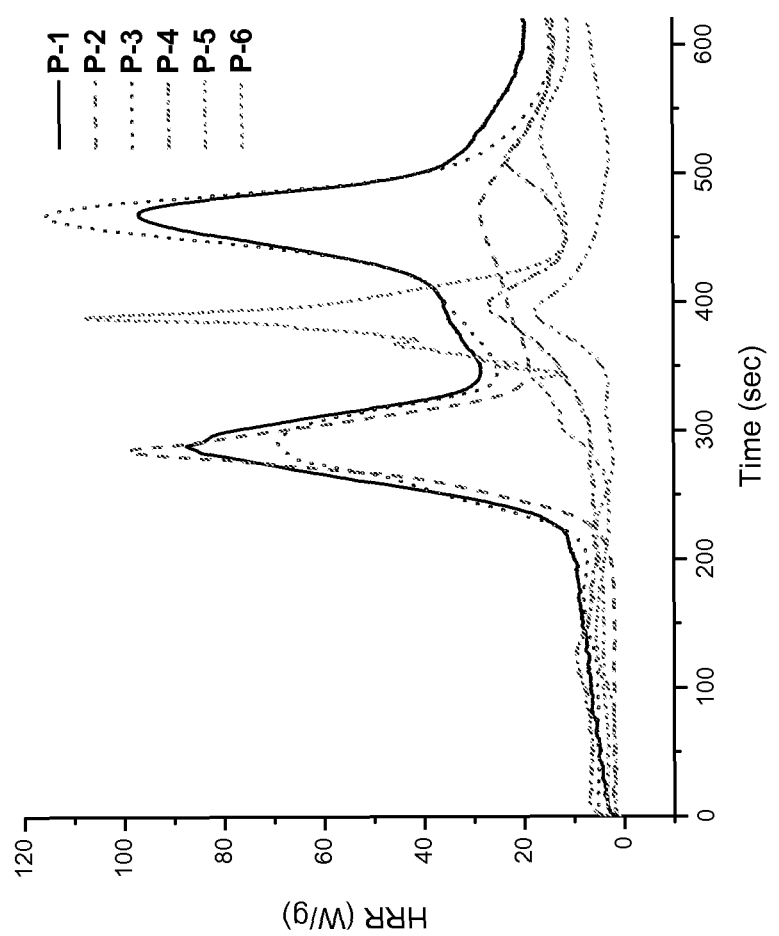
FIG. 18 depicts the heat release rate (W/g) of six exemplary fire retardant polymers over time.

FIG. 18 depicts the heat release rate (HRR), in units of W/g, of samples of polymers P-1, P-2, P-3, P-4, P-5, and P-6 over time. Cone calorimetry is able to provide useful information about the combustion of the polymers and is effective for the laboratory evaluation of the flame retardant properties of polymers. This technique measures the heat release rate (HRR) and peak heat release rate (PHRR); both are considered significant parameters for evaluating the fire retardant properties of materials. Total heat released (THR) is another relevant parameter, which represent the sum of heat released until the flame is extinguished. For example, flame retardant BPC-polycarbonate polymers and BPC-polyarylate polymers, both of which are derived from 1,1-dichloro-2,2-(4-hydroxyphenyl)ethane (BPC), have HRR and THR values of 29 and 21 J/g K, and 3.0 and 7.6 kJ/g, respectively. A highly flame-retardant polymer also shows a low PHRR value.

Electrochemical Properties. To understand the electronic structures of the ionic polymers P-1 to P-6 in relation to charge transport processes in optoelectronic devices, cyclic voltammetry (CV) measurements were performed on films of the ionic polymers. The CV measurements were performed on an EG&G Princeton Applied Research potentiostat/galvanostat instrument (model 263A) in an electrolyte solution of 0.1 M tetrabutylammonium hexafluorophosphate (TBAPF$_6$) in acetonitrile. Platinum (Pt) wire electrodes were used as both counter and working electrodes, and the Ag/Ag$^+$ electrode was used as the reference. A ferrocene/ferrocenium (Fc/Fc$^+$) redox couple was used as an internal standard. The potential values obtained in reference to the Ag/Ag$^+$ electrode were converted to the saturated calomel electrode (SCE) scale.

Films of ionic polymers P-1 to P-6 were coated on the Pt working electrode by dipping the Pt wire into 0.5-1 wt % methanol solutions, and dried under vacuum at 80° C. for 6 hours. The approximate thickness of each film on the electrode was about 1 mµ. All the ionic polymers showed reversible reductions with onset reduction potentials of −1.83 to −1.80 V vs SCE. The formal reduction potentials were also very similar, being in the range of −1.95 to −1.91 V vs SCE. The electron affinity (EA, LUMO level) of P-1 to P-6 was estimated to be virtually identical, between about 2.57 to about 2.59 eV. Irreversible oxidation was observed for all six ionic polymers. By a rough estimation, the ionization potential (IP, HOMO level) for these ionic polymers was found to be ca. 5.40 eV. These results suggest that the electrochemical properties of these ionic polymers are determined primarily by the bis(2,6-diphenylpyridinium) backbone structure. The observed reversible reduction, high electron affinity and irreversible oxidation suggest that these ionic polymers are intrinsic n-type (electron transport) and hole blocking materials.

This work involved synthesizing and characterizing six novel phosphine oxide containing ionic polymers with tunable properties via ring transmutation polymerization and metathesis reactions. The development of these materials aims to meet the need for safe, easily processed, tunable materials. The approach followed enables the production of ionic polymers through a simple polymerization reaction with high yields and purity utilizing DMSO as solvent for the polymerization reaction and methanol-water for their purification. These work also permitted straightforward adjustment of properties by steps such as counterion exchange. Polymers with high glass transition temperatures (Tg>230° C.) and relatively high decomposition temperatures (greater than 340° C.) were achieved. The polymers were found to avoid ignition even after 5 min of exposure to direct fire, demonstrating their ability to act as high temperature, fire retardant materials. These polymers were readily resistant to moisture and common organic solvents, and were found to have excellent film forming properties. The ability of these polymers to absorb light in the UV range of the spectrum and produce photoluminescence in the visible region was also demonstrated. Photoactive, electroactive and robust high temperature tolerant ionic polymers may be useful in the fields of electronics, optoelectronics, fire and corrosion resistant coatings, and structural components for automobiles, aircraft, engines, power and propulsion systems. In addition, they can be used for firefighter garments, printed circuit boards, construction materials, and paper-thin coatings for protecting bonds, securities and stock certificates, real estate titles and deeds.

EXPERIMENTAL DETAILS

Materials. Terephthalaldehyde, acetophenone, triphenylmethanol, p-toluenesulfonic acid monohydrate, 3,5-bis(trifluoromethyl)bromobenzene, diphenylphosphinic chloride, 4-aminophenol, phenylphosphonic dichloride, acetic acid, acetic anhydride, p-bromofluorobenzene, ethyl acetate, triphenyl phosphine oxide, nitric acid, sulfuric acid, hydrochloric acid, potassium hydroxide, sodium bicarbonate, Na$_2$SO$_4$, SnCl$_2$.2H$_2$O, Pd/C, and Mg turnings were purchased from TCI and used as received. For synthesis and purification purposes, reagent grade solvents (ethanol, propanol, toluene, benzene, chloroform, diethyl ether, hexane, tetrahydrofuran, dichloromethane, ethylene chloride, acetonitrile, dimethyl sulfoxide) were used as obtained from Sigma-Aldrich. Spectrophotometric grade solvents obtained from Aldrich were used for optical absorption and fluorescence measurements. High purity acetonitrile (purity >99.9%) obtained from Aldrich was used for electrochemical measurements.

General Characterization Methods. The $^1$H NMR and $^{13}$C NMR spectra of monomers and polymers were recorded on a Varian NMR J 400 spectrometer, 400 MHz at 298° K using both CDCl$_3$ and d$_6$-DMSO as solvents. Their elemental analyses were performed from Numega Resonance Laboratory, CA. To assess the molecular weight of polymer, gel permeation chromatography (GPC) was run at 50° C. with a flow rate of 1 mL/min. The GPC instrument used a Waters 515 pump simultaneously with a Viscotek Model 301 Triple Detector Array. The array contained a laser refractometer, a differential viscometer, and a light scattering detector with both right angle laser light scattering (RALS) and low angle laser light scattering (LALS) in a single instrument, with a fixed interdetector system and temperature control that can be regulated up to 80° C. The instrument was calibrated with a pullulan standard of P-50 obtained from Polymer Standard Services USA, Inc. Separations were accomplished using ViscoGel I-MBHMW-3078 columns purchased from Viscotek. An aliquot of 100-200 µL of 2 mg/mL polymer solution in DMSO containing 0.01 M LiBr was injected. The do/dc values were corrected by injecting different volumes to assess the trend. All data analyses were performed by using Viscotek TriSEC software. Thermogravimetric analysis of the polymer was conducted with a Universal V3.0G TA Instruments. A heating rate of 10° C./min in N$_2$ was used with runs being conducted from room temperature to 800° C. Differential scanning calorimetry (DSC) measurements were run on a TA Instruments Q100 DSC in nitrogen. The heat-cool-heat method was used with an initial heating rate of 40° C./min, a cooling rate of 20° C./min, and a final heating rate of 10° C./min in nitrogen. All transitions were recorded from the second heating cycles of DSC thermograms. The optical absorption and fluorescence properties of these ionic polymers were studied using a Shimadzu UV-2401PC UV-Vis spectrophotometer and PTI Quanta-Master™ Model QM-4/2005 spectrofluorometer, respectively.

Synthesis of 4,4'-(1,4-Phenylene)-bis(2,6-diphenylpyrylium)ditosylate Monomer (M). A mixture of terephthalaldehyde (10.0 g) and acetophenone (54.3 g) was stirred in 250 mL of 95% ethanol at 65° C. After the starting compounds were dissolved, a solution of KOH (10.5 g) in 10 mL of water was added dropwise over 30 min with vigorous stirring. A yellow precipitate formed immediately. The heterogeneous reaction mixture was then heated at reflux until it turned pink over a period of 5 h. During this time, the p-bischalcone was redissolved and reacted with two additional equivalents of acetophenone to form the desired tetraketone, I (Scheme 1), which also precipitated out. The reaction mixture was filtered hot, and the tan solid was collected by filtration to afford 41.0 g of the crude product. It was recrystallized from toluene to afford 38.0 g (89% yield) of off-white crystals of compound I (Scheme 1). The chemical structure and purity of I were confirmed by elemental and $^1$H NMR analyses.

For the conversion of I to compound M (i.e. the second step in Scheme 1), triphenylmethanol (7.8 g) and p-toluenesulfonic acid monohydrate (5.8 g) were added to 100 mL of acetic anhydride, and stirred at room temperature for 3 h. Solid tetraketone I (7.2 g) was then added to the reaction mixture, and the mixture was heated to 100° C. for 1 h. The heterogeneous mixture became clear. Upon cooling, yellow crystals appeared and were collected by filtration, washed carefully with acetic anhydride and ethanol. The product was then recrystallized from acetic acid and dried in vacuum to afford 7.9 g of M (75% yield). $^1$H NMR of M in d$_6$-DMSO, $\delta_H$: 9.35 (4H, s, aromatic meta O$^+$), 9.21 (4H, s, 1,4-phenylene), 7.58-8.93 (20H, m, phenyl), 7.46-7.47 (4H, d, J=6.7 Hz, tosylate), 7.09-7.10 (4H, d, J=7.7 Hz, tosylate), 2.27 (6H, s, CH$_3$).

Bis(3-aminophenyl)phenyl phosphine oxide (m-DAPPO). An amount of 11.14 g of triphenyl phosphine oxide (TPO), II, was placed in a 250 mL flask equipped with a stirrer, nitrogen inlet and a thermometer. A volume of 60 mL of 96% H$_2$SO$_4$ was added and once the reactant was dissolved, the solution was cooled to −5° C. with an ice/salt bath. A solution of 5.80 g of 90% fuming HNO$_3$ in 40 mL H$_2$SO$_4$ was added dropwise over a period of 1 h. The samples were maintained at −5° C. during the addition, increased to rt and left at this temperature for 8 h. The obtained pale yellow solution was poured into 400 mL of ice water resulting in a sticky solid that was collected by decantation. This solid was then dissolved in CHCl$_3$ and washed with aqueous sodium bicarbonate solution until it was neutral. The organic layer was dried over Na$_2$SO$_4$ overnight and filtered. The solvent was removed by rotary evaporation. The crude product was dried in vacuo and recrystallized twice from ethanol to produce 9.6 g (26.1 mmol, 65% yield) of pure product. Elemental and $^1$H NMR analyses were performed to confirm the chemical structure of m-DNPPO.

In the second step, m-DNPPO (5.0 g) was added to a solution of SnCl$_2$·2H$_2$O in 50 mL of concentrated HCl and 100 mL of ethanol. This mixture was left stirring at rt for 2 h and then heated for additional 2 h. The reaction mixture was cooled down to rt and poured into 60 g of KOH in 200 mL of ice water and stirred vigorously. The solid crude product was filtered, washed with H$_2$O until neutral, and recrystallized from chloroform to give 3.5 g (11.4 mmol, 84% yield). The chemical structure of m-DAPPO was confirmed by elemental, $^1$H and $^{13}$C NMR spectra analyses. Anal. Calcd for C$_{18}$H$_{17}$N$_2$OP (308.32): C, 70.12; H, 5.56; N, 9.09. Found: C, 70.17; H, 5.82; N, 9.43.

Bis(3-aminophenyl)-3,5-bis(trifluoromethyl)phenyl phosphine oxide (BATFPO). 1.05 g of Mg turnings and 50 mL of ether were charged into a 250 mL three-necked, round-bottomed flask, equipped with magnetic stirrer, condenser, drying tube, thermometer and nitrogen inlet. The solution was cooled to below 5° C. in an ice bath, then 9.71 g of 3,5-bis(trifluoromethyl)bromobenzene was added dropwise over a period of 1 h, while stirring vigorously. The mixture was allowed to react for additional 5 h. Then 7.00 g of diphenylphosphinic chloride was added dropwise over a period of 1 h. After reacting for additional 18 h, a brown solution was obtained. Next, 10% aqueous sulfuric acid was added to the solution to a pH of 1, followed by the addition of 250 mL water and diethyl ether to form aqueous and organic layers. After decanting the ether layer, the aqueous phase was washed twice with diethyl ether and all organic layers were combined and dried by evaporation, resulting in 3,5-bis(trifluoromethyl)phenyl diphenyl phosphine oxide (TFPO), a light brown solid. TFPO was then dissolved in chloroform and washed several times with 10% sodium bicarbonate and three times with water. The organic layer was condensed by rotary evaporator and stored at room temperature for 12 h and another 12 h in a freezer. The fibrous off-white crystals of TFPO were collected by vacuum filtration and further purified by recrystallization in hexane.

In the second step, bis(3-nitrophenyl)-3,5-bis(trifluoromethyl)phenyl phosphine oxide (DNTFPO) was prepared by the nitration of TFPO using concentrated sulfuric and concentrated nitric acid. Purified TFPO (10.0 g) was added into a 250 mL three-necked flask equipped with a nitrogen inlet, thermometer, drying tube and mechanical stirrer. Concentrated sulfuric acid (23 mL) was added into the flask to dissolve the compound TFPO at room temperature. The solution was cooled down to 0° C. with an ice-water bath. Nitric acid (4.7 mL) was added dropwise to the solution over a period of 1 h, while stirring vigorously and maintaining 0° C. The mixture was allowed to react for 8 h and then poured into 650 g of finely divided ice. The resulting yellowish solid was extracted with chloroform, followed by washing with sodium bicarbonate aqueous solution until the pH reached 7. The solvent was removed with a rotary evaporator and the remaining solid was recrystallized twice from absolute ethanol, which afforded 10.0 g of pale yellow crystals of DNTFPO.

Bis(3-aminophenyl)-3,5-bis(trifluoromethyl)phenyl phosphine oxide (BATFPO) was then prepared by the reduction of DNTFPO with stannous chloride. An amount of 4.0 g of BATFPO was added to a solution of 10.8 g of $SnCl_2 \cdot 2H_2O$ in 30 mL concentrated HCl and 60 mL ethanol, and left stirring at rt for 2 h and heated for additional 2 h. The reaction mixture was cooled down to room temperature, poured into a solution of 40 g KOH in 200 mL of ice water, and stirred vigorously. The solid crude product was filtered and washed with copious amount of $H_2O$ until neutral, giving the crude product of BATFPO, and it was air-dried. It was then further purified by sublimation to afford 3.0 g (86% yield). The $^1H$ and $^{13}C$ NMR spectra, and elemental analysis confirmed its chemical structure and purity. Anal. Calcd for $C_{20}H_{15}N_2OF_6P$ (444.32): C, 54.07; H, 3.40; N, 6.30. Found: C, 53.88; H, 3.80; N, 6.39. It showed a Tm at 228° C. with ΔH=9.0 kcal/mol in the first heating cycle of the DSC thermogram (lit. mp=226-227° C.).

Bis(4-aminophenoxy-4-phenyl) phenyl phosphine oxide (p-BAPPO). First, to a slurry of 2.2 g of magnesium in 50 mL THF in an ice bath, a solution of p-bromofluorobenzene (15 g) in THF (40 mL) was added dropwise over a period of 3 h. This was allowed to stir overnight at room temperature. During this time a gray colored solution appeared. The mixture was again cooled to 0° C. and a solution of phenylphosphonic dichloride (8.35 g) in 20 mL THF was added dropwise over a period of 3-4 h with stirring. The mixture was then warmed to room temperature and stirred for 12 h. The mixture was quenched with 10% $H_2SO_4$ and stirred for 1 h. Ether (200 mL) was added to separate the organic layer, and the aqueous layer was extracted with ether (3×75 mL). The combined ethereal extract was washed with $NaHCO_3$ solution and water, and dried over sodium sulfate. The solvent was removed under reduced pressure to furnish a light brown oil. The crude product was purified by crystallization from THF/hexane (1:1) to afford bis(4-fluorophenyl)-phenylphosphineoxide (p-FPPO) as an off-white solid (89% yield), mp 128-130° C.

In the second step, a magnetically stirred mixture of p-FPPO (4 g), 4-aminophenol (3.06 g) and $K_2CO_3$ (5.28 g) in DMAc (15 mL) was heated to reflux for 24 h in nitrogen. The reaction mixture was then cooled to rt and poured into ice water with vigorous stirring. The precipitated off-white solid product was collected in a Buchner funnel using vacuum filtration, and washed well with water to remove the salt and unreacted 4-aminophenol. The crude product was purified by column chromatography over silica gel eluting with 2% methanol-ethyl acetate to furnish p-BAPPO as an off-white solid powder in 82% yield. The chemical structure was confirmed by $^1H$ and $^{13}C$ NMR and DSC analysis (mp 98-100° C.).

Phenylphosphine oxide-containing poly(4,4'-(p-phenylene)-bis(2,6-diphenylpyridinium)) ionic polymers. The first phenylphosphine oxide-containing poly(4,4'-(p-phenylene)-bis(2,6-diphenylpyridinium)) ionic polymer (P-1) was prepared by the ring-transmutation polymerization reaction as follows: 6.5873 g of compound M was polymerized with m-DAPPO (2.3000 g) on heating in DMSO at 130-140° C. for 24 h (see Scheme 5). The water generated during the polymerization was distilled out from the reaction medium as a toluene/water azeotrope. The yellowish solid P-1 polymer was isolated in 80% yield by two cycles of precipitation with distilled water and dissolution in methanol. P-1 was fully characterized by elemental analysis, and $^1H$ and $^{13}C$ NMR spectra analyses. Anal. Calcd for $C_{72}H_{55}N_2O_7S_2P$ (1155.33): C, 74.85; H, 4.80; N, 2.42; S, 5.55. Found: C, 73.36; H, 4.82; N, 2.44; S, 5.45.

Using the identical ring-transmutation polymerization reaction (Scheme 5) and purification processes, ionic polymer P-2 (77% yield; yellow solid) was obtained by polymerizing compound M (8.4800 g, 6.56 mmol) with BATFPO (2.918 g, 6.56 mmol) in DMSO at 130-140° C. for 24 h. The polymer was essentially isolated in a quantitative yield by precipitation with distilled water. It was further purified by re-dissolving in methanol and by subsequent re-precipitation with the addition of distilled water. Similarly, ionic polymer P-3 (79% yield; dark brown solid) was obtained by polymerizing compound M (5.3787 g, 6.09 mmol) with p-BAPPO (3.0000 g, 6.09 mmol) in DMSO at 130-140° C. for 24 h. The polymer was isolated in a quantitative yield by precipitation with distilled water. It was further purified by re-dissolving in methanol and by subsequent re-precipitation with the addition of distilled water to yield ionic polymer P-3.

The chemical structures of both ionic polymers P-2 and P-3 were also confirmed by elemental, $^1H$ and $^{13}C$ NMR spectra analyses. Elemental analysis for P-2 polymer: Anal. Calcd. for $C_{79}H_{53}N_2O_7F_6S_2P$ (1291.34): C, 68.83; H, 4.14; N, 2.17; S, 4.97. Found: C, 66.38; H, 4.69; N, 2.28; S, 5.74. Elemental analysis for P-3 polymer: Anal. Calcd for $C_{84}H_{63}N_2O_9S_2P$ (1339.55): C, 75.32; H, 4.74; N, 2.09; S, 4.79. Found: C, 71.87; H, 5.24; N, 2.05; S, 5.00.

Ionic polymer P-4 was prepared by the metathesis reaction of ionic polymer P-1 with lithium triflimide in DMSO (Scheme 6). 1.40 g (1.21 mmol) of polymer P-1 was dissolved in 50 mL of DMSO. To the DMSO solution of polymer P-1, lithium triflimide (0.73 g, 2.54 mmol) was slowly added. The resulting solution was kept at 50° C. for 48 h with continuous stirring. After reducing the volume of DMSO solution by a rotary evaporator, the reaction mixture was added to distilled water, affording the desired ionic polymer P-4. It was collected by vacuum filtration, washed several times with a large quantity of hot distilled water, and dried in vacuum at 100° C. for 72 h and weighed to give 1.58 g (1.50 mmol) of polymer P-4 (95% yield). Anal. Calcd for $C_{62}H_{41}N_4O_9F_{12}S_4P$ (1373.24): C, 54.23; H, 3.01; N, 4.08; S, 9.34. Found: C, 54.41; H, 3.19; N, 4.02; S, 9.05.

Using a similar metathesis reaction, ionic polymer P-5 was prepared from ionic polymer P-2. 1.40 g (1.08 mmol) of P-2 was dissolved in 50 mL of DMSO. To the DMSO solution of this polymer, lithium triflimide (0.73 g, 2.28 mmol) was added. The resulting solution was kept at 50° C.

for 48 h. After reducing the DMSO solution by rotary evaporation, the reaction mixture was added to distilled water, affording the desired ionic polymer P-5. It was collected by vacuum filtration, washed several times with a large quantity of hot distilled water. This procedure was repeated once more and then the collected polymer was dried in vacuum at 100° C. for 72 h and weighted to give 1.54 g (1.02 mmol) of polymer P-5. However, the $^1$H NMR spectrum of this polymer showed a pair of doublets [δ=7.09 (d) and 7.46 ppm (d)] suggesting the incomplete exchange of tosylate ions by triflimide ions. To complete the exchange of tosylate ions to produce polymer P-5, the metathesis reaction was carried out for a third time yielding the successful metathesis reaction product.

Using the identical procedure, ionic polymer P-6 was prepared by the metathesis reaction of P-3 with lithium triflimide in DMSO. The chemical structures and purities of ionic polymers P-5 and P-6 were confirmed by elemental, $^1$H and $^{13}$C NMR spectra analyses. Elemental analysis for polymer P-5: Anal. Calcd for $C_{64}H_{39}N_4O_9F_{18}S_4P$ (1509.23): C, 50.93; H, 2.60; N, 3.71; S, 8.50. Found: C, 50.26; H, 2.71; N, 3.75; S, 10.25. Elemental analysis for polymer P-6: Anal. Calcd for $C_{74}H_{49}N_4O_{11}F_{12}S_4P$ (1557.43): C, 57.07; H, 3.17; N, 3.60; S, 8.23. Found: C, 54.57; H, 3.77; N, 3.55; S, 8.88.

Cyclic Voltammetry Measurements. Cyclic voltammetry experiments were done on an EG&G Princeton Applied Research potentiostat/galvanostat (model 263A). Data were collected and analyzed by the model 270 Electrochemical Analysis System software. A three-electrode electrochemical cell was used in all experiments as previously described. Platinum wire electrodes were used as both counter and working electrodes, and silver/silver ion (Ag in 0.1 M AgNO$_3$ solution, Bioanalytical System, Inc.) was used as a reference electrode. The Ag/Ag$^+$ (AgNO$_3$) reference electrode was calibrated at the beginning of the experiments by running cyclic voltammetry on ferrocene/ferrocenium ion as the internal standard. By means of the internal ferrocenium/ferrocene (Fc$^+$/Fc) standard, the potential values, obtained in reference to Ag/Ag$^+$ electrode, were converted to the saturated calomel electrode (SCE) scale. The films of all ionic polymers were coated on the Pt working electrode by dipping the Pt wire into the viscous solution in methanol and then dried it in a vacuum oven at 80° C. for 8 h. An electrolyte solution of 0.1 M TBAPF$_6$ in a mixed water/acetonitrile solvent was used in all experiments. All solutions in the three-electrode cell were purged with ultrahigh-purity nitrogen for 10-15 min before each experiment, and a blanket of N$_2$ was used during the experiment.

REFERENCES

Each of the following citations is fully incorporated herein by reference in its entirety.

[1] (a) C. Negrell-Guirao, B. Boutevin, G. David, A. Fruchier, R. Sonnier, J.-M. Lopez-Cuesta, Polym. Chem. 2011, 2, 236; (b) C. Negrell-Guirao, B. Boutevin, Macromolecules 2009, 42, 2446; (c) F. Laoutid, L. Bonnaud, M. Alexandre, J.-M. Lopez-Cuesta, P. Dubois, Mater. Sci. Eng. R 2009, 63, 100; (d) E. D. Weil, S. V. Levchik, J. Fire Sci. 2008, 26, 243; (e) S. V. Levchik, E. D. Weil, J. Fire Sci. 2006, 24, 345; (f) S. V. Levchik, E. D. Weil, Polym. Int. 2005, 54, 11; (g) S. V. Levchik, E. D. Weil, Polym. Int. 2004, 53, 1901; (h) S.-Y. Lu, I. Hamerton, Prog. Polym. Sci. 2002, 27, 1661; (i) G. E. Zaikov, S. M. Lomakin, J. Appl. Polym. Sci. 1998, 68, 715; (j) C. F. Cullis, M. M. Hirschler, The Combustion of Organic Polymers, Oxford University: New York, 1980; (k) J. W. Lyons, The Chemistry and Uses of Fire Retardant, Wiley: New York, 1970.

[2] (a) C. Wang, M. Kilitziraki, J. A. H. MacBride, M. R. Bryce, L. E. Horsburgh, A. K. Sheridan, A. P. Monkman, I. D. W. Samuel, Adv. Mater. 2000, 12, 217; (b) H. Hong, R. Sfez, E. Vaganova, S. Yitzchaik, D. Davidov, Thin Solid Films 2000, 366, 260; (c) Y. Z. Wang, A. J. Epstein, Acc. Chem. Res. 1999, 32, 217; (d) X. Zhang, A. S. Shetty, S. A. Jenekhe, Acta Polym. 1998, 49, 52.

[3] (a) S. A. Jenekhe, M. M. Alam, Y. Zhu, S. Jiang, A. V. Shevade, Adv. Mater. 2007, 19, 536; (b) C. J. Tonzola, M. M. Alam, S. A. Jenekhe, Macromolecules 2005, 38, 9839; (c) C. J. Tonzola, M. M. Alam, S. A. Jenekhe, Macromol. Chem. Phys. 2005, 206, 1271; (d) T. W. Kwon, M. M. Alam, S. A. Jenekhe, Chem. Mater. 2004, 16, 4657.

[4] (a) Y. Eichen, G. Nakhmanovich, V. Gorelik, O. Epshtein, J. M. Poplawski, E. Ehrenfreund, J. Am. Chem. Soc. 1998, 120, 10463; (b) A. J. Epstein, Y. Z. Wang, S. W. Jessen, J. W. Blatchford, D. D. Gebler, L.-B Lin, T. L. Gustafson, T. M. Swager, A. G. MacDiarmid, Macromol. Symp. 1997, 116, 27; (c) Y. Z. Wang, D. D. Gebler, D. K. Fu, T. M. Swager, A. G. MacDiarmid, A. J. Epstein, Synth. Met. 1997, 85, 1179; (d) K. A. Bunten, A. K. Kakkar, Macromolecules 1996, 29, 2885.

[5] (a) D. D. Gebler, Y. Z. Wang, J. W. Blatchford, S. W. Jessen, L.-B. Lin, T. L. Gustafson, H. L. Wang, T. M. Swager, A. G. MacDiarmid, A. J. Epstein, J. Appl. Phys. 1995, 78, 4264; (b) T. Yamamoto, T. Muruyama, Z.-h Zhou, T. Ito, T. Fukuda, Y. Yoneda, F. Begum, T. Ikeda, S. Sasaki, H. Takezoe, A. Fukuda, K. Kubota, J. Am. Chem. Soc. 1994, 116, 4832.

[6] T. Kawai, T. Yamaue, M. Onoda, K. Yoshino, Synth. Met. 1999, 102, 971.

[7] (a) H. Han, P. R. Vantine, A. K. Nedeltchev, P. K. Bhowmik, J. Polym. Sci. Part A: Polym. Chem. 2006, 44, 1541; (b) P. K. Bhowmik, H. Han, I. V. Nedeltchev, J. Polym. Sci. Part A: Polym. Chem. 2002, 40, 2015; (c) P. K. Bhowmik, H. Han, J. J. Cebe, R. A. Burchett, A. M. Sarker, J. Polym. Sci. Part A: Polym. Chem. 2002, 40, 659; (d) P. K. Bhowmik, A. H. Molla, H. Han, M. E. Gangoda, R. N. Bose, Macromolecules 1998, 31, 621; (e) P. K. Bhowmik, S. Akhter, H. Han, J. Polym. Sci. Part A: Polym. Chem. 1995, 40, 1927; (f) P. K. Bhowmik, H. Han, J. Polym. Sci. Part A: Polym. Chem. 1995, 40, 1745; (g) H. Han, P. K. Bhowmik, Trends Polym. Sci. 1995, 3, 199; (h) P. K. Bhowmik, W. Xu, H. Han, J. Polym. Sci. Part A: Polym. Chem. 1994, 32, 3205.

[8] P. Masson, P. Gramain, D. Guillon, Macromol. Chem. Phys. 1999, 200, 616.

[9] W.-Y. Zheng, R.-H. Wang, K. Levon, Z. Y. Rong, T. Taka, W. Pan, Macromol. Chem. Phys. 1995, 196, 2443.

[10] Y. Cao, P. Smith, Polymer 1993, 34, 3139.

[11] (a) A. Merz, S. Reitmeier, Angew. Chem., Int. Ed. Engl. 1989, 28, 807; (b) J. S. Moore, S. I. Stupp, Macromolecules 1986, 19, 1815; (c) H. Akahoshi, S. Toshima, K. Itaya, J. Phys. Chem. 1981, 85, 818; (d) M. S. Simon, P. T. Moore, J. Polym. Sci., Part A: Polym. Chem. 1975, 13, 1.

[12] (a) T. S. Jo, A. K. Nedeltchev, B. Biswas, H. Han, P. K. Bhowmik, Polymer 2012, 53, 1063; (b) A. K. Nedeltchev, H. Han, P. K. Bhowmik, L. Ma, J. Polym. Sci. Part A: Polym. Chem. 2011, 49, 1907; (c) A. K. Nedeltchev, H. Han, P. K. Bhowmik, L. Ma, J. Polym. Sci. Part A: Polym. Chem. 2010, 48, 4611; (d) A. K. Nedeltchev, H. Han, P. K. Bhowmik, L. Ma, J. Polym. Sci. Part A: Polym. Chem. 2010, 48, 4408; (e) A. K. Nedeltchev, H. Han, P. K. Bhowmik, Polym. Chem. 2010, 1, 908; (f) P. K. Bhowmik, H. Han, A. K. Nedeltchev, H. D. Mandal, J. A. Jimenez-Hernandez, P. M. McGannon, J. Appl. Polym. Sci. 2010, 116, 1197; (g) P. K. Bhowmik, H. Han, A. K. Nedeltchev, H. D. Mandal, J. A. Jimenez-Hernandez, P. M. McGannon, Polymer 2009, 50, 3128; (h) P. K. Bhowmik, S. Kamatam, H. Han, A. K. Nedeltchev, Polymer 2008, 49, 1748; (i) P. K. Bhowmik, H. Han, A. K. Nedeltchev, Polymer 2006, 47, 8281; (j) P. K. Bhowmik, H. Han, A. K. Nedeltchev, J. Polym. Sci. Part A: Polym. Chem. 2006, 44, 1028; (k) P. K. Bhowmik, H. Han, J. J. Cebe, I. K. Nedeltchev, S.-W. Kang, S. Kumar, Macromolecules 2004, 37, 2688; (l) P. K. Bhowmik, R. A. Burchett, H. Han, J. J. Cebe, Polymer 2002, 43, 1953; (m) P. K. Bhowmik, R. A. Burchett, H. Han, J. J. Cebe, Macromolecules 2001, 34, 7579; (n) P. K. Bhowmik, R. A. Burchett, H. Han, J. J. Cebe, J. Polym. Sci. Part A: Polym. Chem. 2001, 39, 2710.

[13] I. K. Spiliopoulos, J. A. Mikroyannidis, J. Polym. Sci. Part A: Polym. Chem. 2001, 39, 2454.

[14] (a) F. W. Harris, K. C. Chuang, S. A. X. Huang, J. J. Janimak, S. Z. D. Cheng, Polymer 1994, 35, 4940; (b) S. A. X. Huang, K. C. Chuang, S. Z. D. Cheng, F. W. Harris, Polymer 2000, 41, 5001.

[15] (a) G. Decher, Science 1997, 277, 1232; (b) P. Bertrand, A. Jonas, A. Laschewsky, R. Legras, Macromol. Rapid Commun. 2000, 21, 319; (c) X. Arys, A. Laschewsky, A. M. Jonas, Macromolecules 2001, 34, 3318; (d) X. Arys, P. Fischer, A. M. Jonas, M. M. Koetse, A. Laschewsky, R. Legras, E. Wischerhoff, J. Am. Chem. Soc. 2003, 125, 1859.

[16] (a) Z. Tang, N. A. Kotov, S. Magonov, B. Ozturk, Nat. Mater. 2003, 2, 413; (b) A. Laschewsky, F. Mallwitz, J.-F. Baussard, D. Cochin, P. Fischer, J.-L. H. Jiwan, E. Wischerhoff, Macromol. Symp. 2004, 211, 135.

[17] (a) E. Holder, V. Marin, A. Alexeev, U. S. Schubert, J. Polym. Sci. Part A: Polym. Chem. 2005, 43, 2765; (b) R. Dobrawa, F. Wurthner, J. Polym. Sci. Part A: Polym. Chem. 2005, 43, 4981.

[18] Y. Bar-Cohen, "Electroactive polymers as artificial muscles-reality and challenges." Proceeding of the 42nd AIAA Structures, Structures Dynamics and Materials Conferences (SDM), Gossamer Spacecraft Forum (GSF), held in Seattle, Wash., Apr. 16-19, 2001. [19] (a) Y. W. Chen-Yang, C. Y. Yuan, C. H. Li, H. C. Yang, J. Appl. Polym. Sci. 2003, 90, 1357; (b) W. Wu, C. Q. Yang, J. Appl. Polym. Sci. 2003, 90, 1885; (c) A. Rosy, J. Polym. Sci. Part A: Polym. Chem. 1993, 31, 3187.

[20] (a) Y.-L. Liu, G.-H. Hsiue, C.-W. Lan, Y.-S. Chiu, J. Polym. Sci. Part A: Polym. Chem. 1997, 35, 1769; (b) H-J. Kim, J.-K. Choi, B.-W. Jo, J.-H. Chang, R. J. Farris, Korea Polym. J. 1998, 6, 84; (c) C. Tian, H. Wang, X. Liu, Z. Ma, H. Guo, J. Xu, J. Appl. Polym. Sci. 2003, 89, 3137.

[21] (a) H. Galip, H. Hasipoğlu, G. Gündüz, J. Appl. Polym. Sci. 1999, 74, 2906; (b) J. Liu, Y. Gao, F. Wang, M. Wu, J. Appl. Polym. Sci. 2000, 75, 384; (c) T. Kashiwagi, A. B. Morgan, J. M. Antonucci, M. R. VanLandingham, R. H. Harris, Jr., W. H. Awad, J. R. Shields, J. Appl. Polym. Sci. 2003, 89, 2072.

[22] (a) Q. Wu, J. Lu, B. Qu, Polym. Int. 2003, 52, 1326; (b) Y.-L. Liu, G.-H. Hsiue, Y.-S. Chiu, J. Polym. Sci. Part A: Polym. Chem. 1997, 35, 565.

[23] (a) K. G. Gravalos, J. Polym. Sci. Part A: Polym. Chem. 1992, 30, 2521; (b) Y. L. Liu, Y. L. Liu, R. J. Jeng, Y.-S. Chiu, J. Polym. Sci. Part A: Polym. Chem. 2001, 39, 1716; (c) R. P. Mateva, N. V. Dencheva, J. Appl. Polym. Sci. 1993, 47, 1185.

[24] (a) Z. Ma, W. Zhao, Y. Liu, J. Shi, J. Appl. Polym. Sci. 1997, 63, 1511; (b) K. Faghihi, M. Hajibeygi, J. Appl. Polym. Sci. 2004, 92, 3447.

[25] J. W. Connell, K. A. Watson, High Perform. Polym. 2001, 13, 23.

[26] (a) J. W. Connell, P. M. Hergenrother, J. G. Smith, Jr., The USA as represented by the Administrator of the NASA, US Patent Specification 5 245 044, 1994; (b) J. W. Connell, P. M. Hergenrother, J. G. Smith, Jr., (The USA as represented by the Administrator of the NASA) US Patent Specification 5317078, 1994; (c) J. W. Connell, P. M. Hergenrother, J. G. Smith, Jr., (The USA as represented by the Administrator of the NASA) US Patent Specification 5412059, 1995.

[27] (a) C. D. Smith, H. Grubbs, H. F. Webster, A. Gungör, J. P. Wightman, J. E. McGrath, High Perform. Polym. 1991, 3, 211; (b) J. G. Smith, Jr., J. W. Connell, P. M. Hergenrother, Polymer 1994, 35, 2834; (c) J. W. Connell, J. G. Smith, Jr., P. M. Hergenrother, Polymer 1995, 36, 5.

[28] (a) J. W. Connell, J. Smith, Jr., J. Hedrick, Polymer 1995, 36, 13; (b) J. Lennhoff, G. Harris, J. Vaughn, D. Edwards, J. Zwiener, High Perform. Polym. 1999, 11, 101.

[29] (a) D. Wilson, H. D. Stenzenberg, P. M. Hergenrother, Polyimides; Blackie: Glasgow, 1990; (b) Y.-L. Liu, G.-H. Hsiue, Y.-S. Chiu, R.-J. Jeng, J. Appl. Polym. Sci. 1996, 61, 1789. (c) P. Schuler, H. B. Mojazza, R. Haghighat, High Perform. Polym. 2000, 12, 113.

[30] (a) M. F. Martinez-Núñez, V. N. Sekharipuram, J. E. McGrath, Polym. Prepr., Am. Chem. Soc. Div. Polym. Chem. 1994, 35(2), 709; (b) C. Kizilkaya, S. Karata, N.-K. Apohan, A. Güngör, J. Appl. Polym. Sci. 2010, 115, 3256; (c) T. Brock, D. C. Sherrington, J. Swindell, J. Mater. Chem. 1994, 4, 229; (d) K. U. Jeong, J.-J Kim, T.-H. Yoon, Polymer 2001, 42, 6019; (e) P. M. Hergenrother, S. J. Havens, J. Polym. Sci. Part A: Polym. Chem. 1989, 27, 1161.

[31] (a) A. K. Agrawal, S. A. Jenekhe, Chem. Mater. 1996, 8, 579; (b) C.-J. Yang, S. A. Jenekhe, Macromolecules 1995, 28, 1180.

Various features and advantages of the invention are set forth in the following claims.

What is claimed is:

1. A fire retardant polymer comprising at least one pyridinium salt moiety and at least one phosphine oxide moiety, wherein the polymer has the following structure:

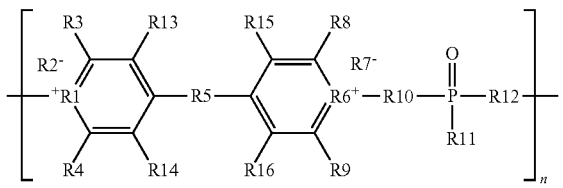

wherein R1 and R6 are each N;
wherein R2 and R7 are each negatively charged counterions;
wherein R3, R4, R8, R9, R11, R13, R14, R15, and R16 are each selected from the group consisting of H and groups comprising one or more carbon atoms; and
wherein R5, R10, and R12 are any group comprising one or more carbon atoms, and
wherein n is a number between 2 and about 100,000.

2. The polymer of claim 1, wherein

R2 and R7 are each individually selected from the group consisting of aryl and heteroaryl sulfonates, aryl and heteroaryl borates, and dihaloalkyl sulfonamides;

R3, R4, R8, R9, R11, R13, R14, R15, and R16 are each individually selected from the group consisting of H, alkyl, aryl and heteroaryl;

R5, R10, and R12 are each individually selected from the group consisting of alkyl, alkenyl, alkynyl, aryl and heteroaryl; and n is a number between 2 and about 100,000.

3. The polymer of claim 1, wherein at least one of R3, R4, R8, R9, R13, R14, R15, and R16 comprises a phenyl group.

4. The polymer of claim 1, wherein at least one of R10, R11, and R12 comprises a phenyl group.

5. The polymer of claim 1, wherein R3, R4, R5, R8, R9, R10, R11, and R12 each comprise a phenyl group.

6. The polymer of claim 1, wherein R2 and R7 are each individually selected from the group consisting of tosylate and triflimide.

7. The polymer of claim 1, wherein

R2 and R7 are each individually tosylate or triflimide; and

R3, R4, R5, R8, R9, R10, R11, R12, R13, R14, R15, and R16 are each aryl.

8. The polymer of claim 7, wherein

R3, R4, R5, R8, R9, R13, R14, R15, and R16 are each phenyl;

R11 is phenyl or haloalkylphenyl,

R10 and R12 are each individually phenyl or phenoxyphenyl.

9. A method of making a polymer comprising at least one pyridinium salt moiety and at least one phosphine oxide moiety, the method comprising reacting a bispyrylium compound with a diamine phosphorous oxide using a ring-transmutation polymerization reaction.

10. A device comprising the polymer of claim 1 wherein the device is selected from at least one of a window, wooden beam, dry wall, construction material in a building or a vehicle, a medical device, insulation for an electrical component, a firefighter garment, a printed circuit board, and a coating for paper goods.

11. A method of inhibiting combustion of a material, comprising applying the polymer of claim 1 to the material.

* * * * *